United States Patent
Kikuchi et al.

(10) Patent No.: US 9,378,050 B2
(45) Date of Patent: Jun. 28, 2016

(54) ASSIGNING AN OPERATION TO A COMPUTING DEVICE BASED ON A NUMBER OF OPERATIONS SIMULTANEOUSLY EXECUTING ON THAT DEVICE

(71) Applicant: FUJITSU LIMITED, Kawasaki-shi, Kanagawa (JP)

(72) Inventors: Shinji Kikuchi, Yokohama (JP); Yasuhide Matsumoto, Kawasaki (JP); Yuji Wada, Tokyo (JP); Atsuji Sekiguchi, Kawasaki (JP); Masazumi Matsubara, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 276 days.

(21) Appl. No.: 13/958,099

(22) Filed: Aug. 2, 2013

(65) Prior Publication Data

US 2013/0318532 A1    Nov. 28, 2013

Related U.S. Application Data

(63) Continuation of application No. PCT/JP2011/052667, filed on Feb. 8, 2011.

(51) Int. Cl.
  *G06F 9/48* (2006.01)
  *G06F 9/50* (2006.01)

(52) U.S. Cl.
  CPC ........ *G06F 9/48* (2013.01); *G06F 9/505* (2013.01); *G06F 9/5055* (2013.01)

(58) Field of Classification Search
  None
  See application file for complete search history.

(56) References Cited

U.S. PATENT DOCUMENTS

| | | | |
|---|---|---|---|
| 6,725,211 B1 * | 4/2004 | Ashton et al. | |
| 8,321,870 B2 * | 11/2012 | Messier et al. | 718/102 |
| 8,831,026 B2 * | 9/2014 | Iyengar | H04L 67/322 370/395.43 |
| 2002/0059427 A1 | 5/2002 | Tamaki et al. | |

(Continued)

FOREIGN PATENT DOCUMENTS

| | | |
|---|---|---|
| JP | 2002-24192 | 1/2002 |
| JP | 2003-58518 | 2/2003 |

(Continued)

OTHER PUBLICATIONS

International Search Report mailed May 17, 2011 in corresponding International Application No. PCT/JP2011/052667.

(Continued)

*Primary Examiner* — Meng An
*Assistant Examiner* — Michael Ayers
(74) *Attorney, Agent, or Firm* — Staas & Halsey LLP

(57) ABSTRACT

A computer-readable recording medium stores an execution control program that causes a computer to execute a process that includes receiving an execution request for a given operation for a system; detecting number of operations that are of a type identical to that of the given operation and are under execution by a computing device that is in the system and involved in the execution of the given operation for which the execution request is received; comparing the number of operations detected at the detecting and the number of operations that are of the type and simultaneously executable by the computing device such that the execution of the given operation is completed within a given period by the computing device; and assigning the given operation to the computing device, based on a result of comparison at the comparing.

8 Claims, 23 Drawing Sheets

(56) References Cited

U.S. PATENT DOCUMENTS

| | | |
|---|---|---|
| 2005/0081211 A1* | 4/2005 | Koga et al. .................... 718/105 |
| 2007/0220520 A1 | 9/2007 | Tajima |
| 2010/0332658 A1 | 12/2010 | Elyashev |
| 2011/0231856 A1* | 9/2011 | Son et al. ...................... 718/103 |

FOREIGN PATENT DOCUMENTS

| | | |
|---|---|---|
| JP | 2003-316587 | 11/2003 |
| JP | 2005-293048 | 10/2005 |
| JP | 2007-133578 | 5/2007 |

OTHER PUBLICATIONS

International Preliminary Report on Patentability mailed Aug. 22, 2013 in corresponding International Patent Application No. PCT/JP2011/052667.

Extended European Search Report dated Mar. 31, 2016 in corresponding European Patent Application No. 11858287.3.

* cited by examiner

FIG.3

POLICY INFORMATION TABLE — 300

| POLICY NAME | CONTENTS |
|---|---|
| P1 | LM PROCESSING TIME IS "WITHIN ((EXECUTION TIME AT MULTIPLEXING DEGREE "1")×2) AND "WITHIN 2 MIN". |
| P2 | LM PROCESSING TIME IS "WITHIN "(VM SIZE [GB]×30 [SEC]". |
| P3 | SATISFY POLICIES P1 AND P2. |
| P4 | VM START PROCESS IS "COMPLETED WITHIN 1 [MIN]". |
| P5 | PATCH APPLYING PROCESS FOR APPLICATION X IS "WITHIN ((EXECUTION TIME AT MULTIPLEXING DEGREE "1")×5)". |
| ...... | ...... |

300-1, 300-2, 300-3, 300-4, 300-5

| OPERATION ID | TYPE | PROCESS CONTENTS | NAME OF APPLICABLE POLICY | INVOLVED RESOURCE |
|---|---|---|---|---|
| OP1 | LM | MIGRATE VM1 FROM SvrA TO SvrB | P1 | VM1(1[GB]), SvrA(src), SvrB(dst) |

EXECUTION REQUEST — 400

FIG.6

RECOMMENDED MULTIPLEXING DEGREE TABLE — 600

| | TYPE | RECOMMENDED MULTIPLEXING DEGREE | CONDITION |
|---|---|---|---|
| 600-1 | LM | 3 | (CPU≤25%) and (I/O≤25%) and (size≤1GB) |
| 600-2 | LM | 2 | ((CPU≤30%) and (I/O≤40%) and (size≤1GB)) or ((CPU≤40%) and (I/O≤20%) and (size≤2GB)) |
| 600-3 | LM | 1 | Others |

RESOURCE USE STATUS TABLE 700

| RESOURCE NAME | OPERATION UNDER EXECUTION | MULTIPLEXING DEGREE |
|---|---|---|
| SvrA | OP1, OP2 | 2 |
| SvrB | OP1 | 1 |
| SvrC |  | 0 |
| SvrD | OP2 | 1 |
| SW X | OP1, OP2 | 2 |
| SW Y | OP2 | 1 |

LOG INFORMATION 900

| | OPERATION ID | TYPE | VM ID | VM SIZE [GB] | MULTI-PLEXING DEGREE | PROCES-SING TIME [SEC] | CPU [%] | I/O [%] | ... |
|---|---|---|---|---|---|---|---|---|---|
| L1 | OP1 | LM | VM1 | 1 | 3 | 20 | 20 | 10 | ... |
| | OP2 | LM | VM2 | 2 | 2 | 50 | 40 | 20 | ... |
| | OP3 | LM | VM3 | 1 | 5 | 60 | 30 | 40 | ... |
| ............ | OP4 | LM | VM4 | 2 | 2 | 70 | 90 | 60 | ... |
| | OP5 | LM | VM5 | 1 | 3 | 25 | 25 | 25 | ... |
| | OP6 | LM | VM6 | 1 | 2 | 28 | 30 | 40 | ... |
| L7 | OP7 | LM | VM7 | 1 | 2 | 10 | 5 | 5 | ... |

FIG.10A

| OPERA-TION ID | TYPE | VM ID | VM SIZE [GB] | MULTI-PLEXING DEGREE | PROCES-SING TIME [SEC] | CPU [%] | I/O [%] | ... | |
|---|---|---|---|---|---|---|---|---|---|
| OP1 | LM | VM1 | 1 | 3 | 20 | 20 | 10 | ... | L1 |
| OP2 | LM | VM2 | 2 | 2 | 50 | 40 | 20 | ... | |
| OP3 | LM | VM3 | 1 | 5 | 60 | 30 | 40 | ... | |
| OP4 | LM | VM4 | 2 | 2 | 70 | 90 | 60 | ... | |
| OP5 | LM | VM5 | 1 | 3 | 25 | 25 | 25 | ... | |
| OP6 | LM | VM6 | 1 | 2 | 28 | 30 | 40 | ... | |
| OP7 | LM | VM7 | 1 | 2 | 10 | 5 | 5 | ... | L7 |

| OPERA-TION ID | TYPE | VM ID | VM SIZE [GB] | MULTI-PLEXING DEGREE | PROCES-SING TIME [SEC] | CPU [%] | I/O [%] | ... | |
|---|---|---|---|---|---|---|---|---|---|
| OP1 | LM | VM1 | 1 | 3 | 20 | 20 | 10 | ... | L1 |
| OP2 | LM | VM2 | 2 | 2 | 50 | 40 | 20 | ... | L2 |
| OP5 | LM | VM5 | 1 | 3 | 25 | 25 | 25 | ... | L5 |
| OP6 | LM | VM6 | 1 | 2 | 28 | 30 | 40 | ... | L6 |
| OP7 | LM | VM7 | 1 | 2 | 10 | 5 | 5 | ... | L7 |

| TYPE | RECOMMENDED MULTIPLEXING DEGREE | CONDITION | |
|---|---|---|---|
| LM | 3 | (CPU≤25%) and (I/O≤25%) and (size≤1GB) | 600-1 |
| LM | 2 | ((CPU≤30%) and (I/O≤40%) and (size≤1GB)) or ((CPU≤40%) and (I/O≤20%) and (size≤2GB)) | 600-2 |
| LM | 1 | Others | 600-3 |

FIG. 17
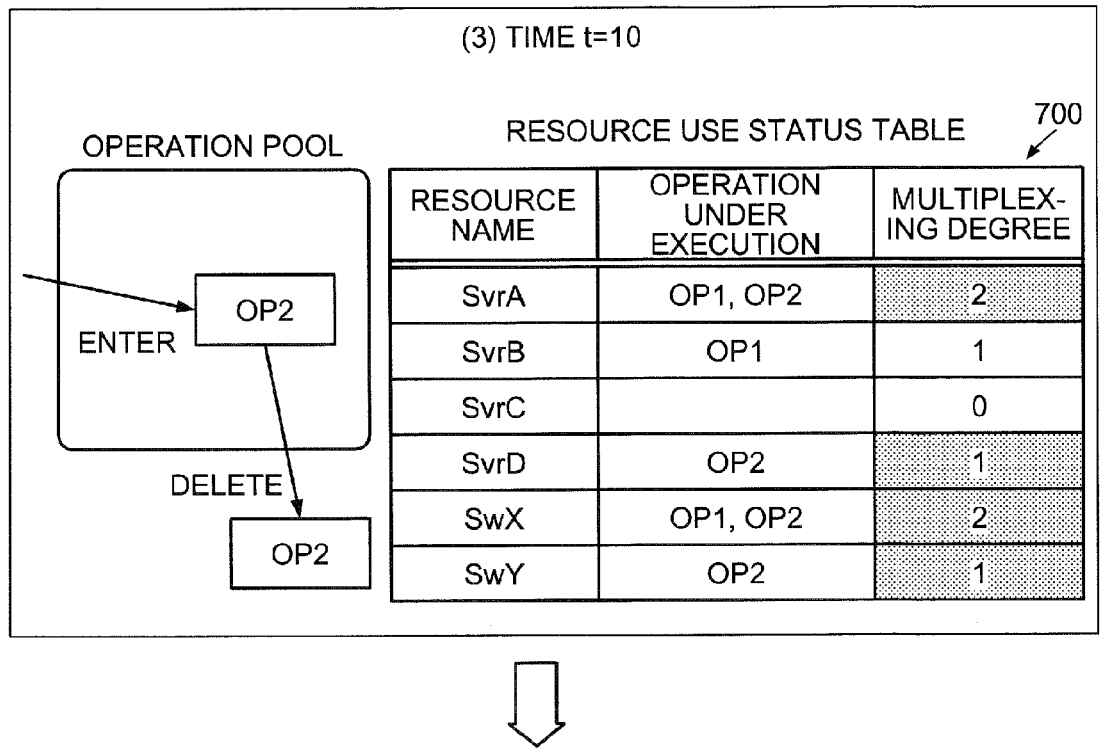
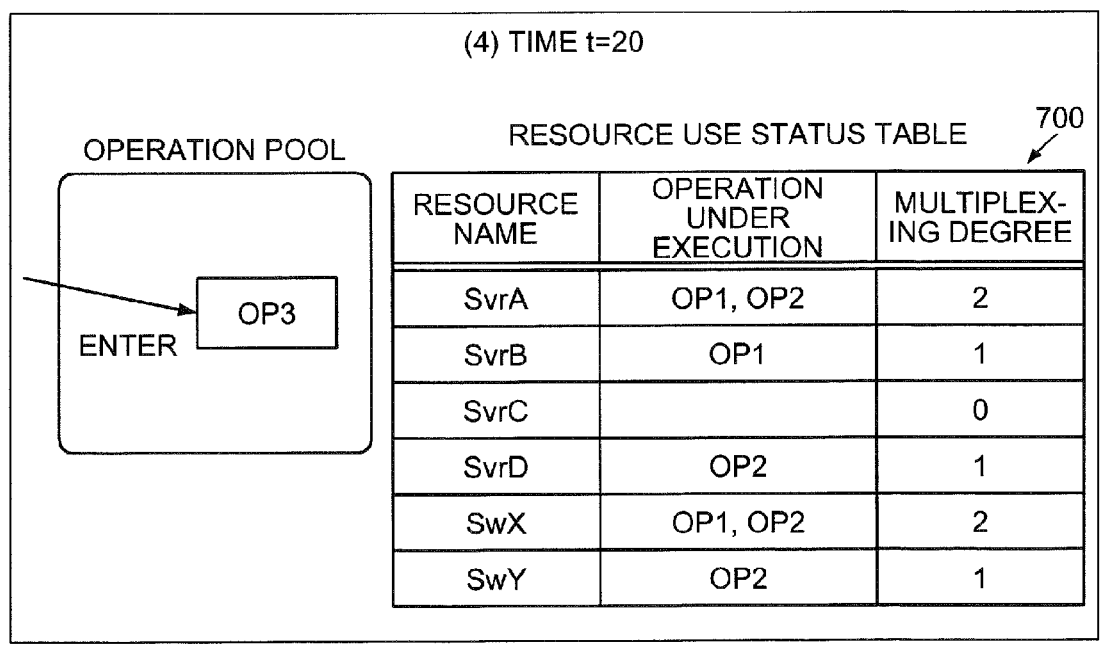

FIG.20
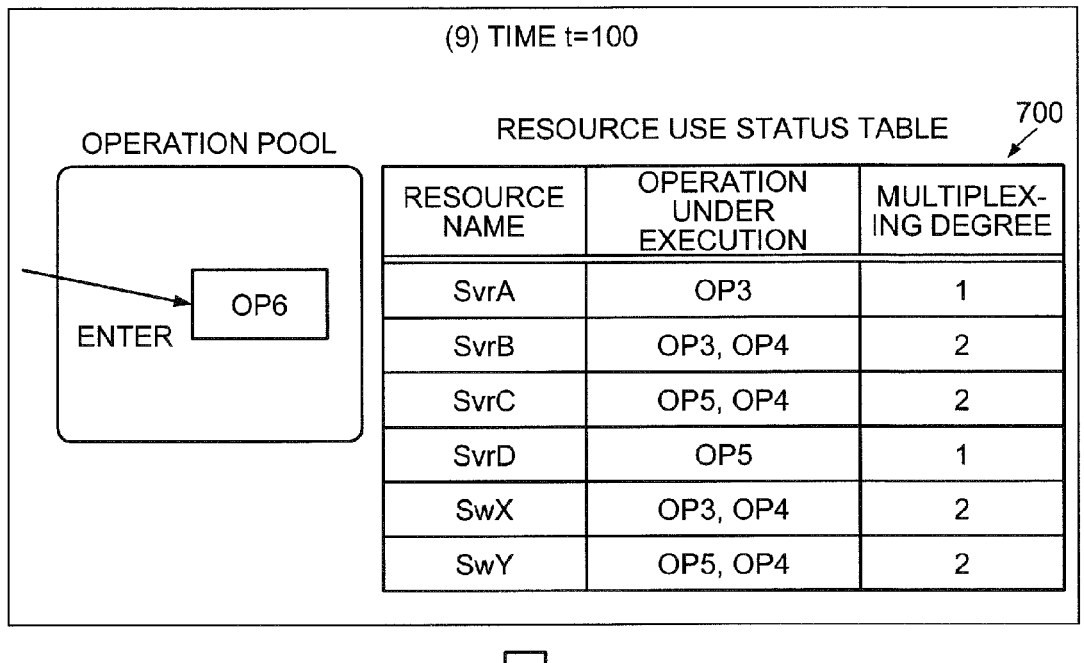
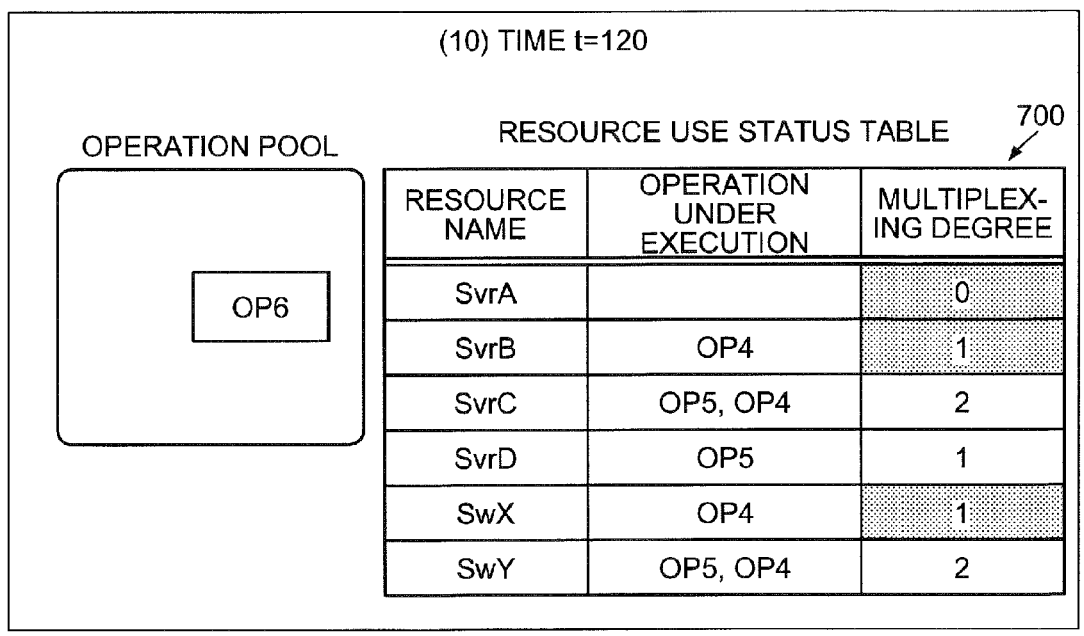

FIG.21
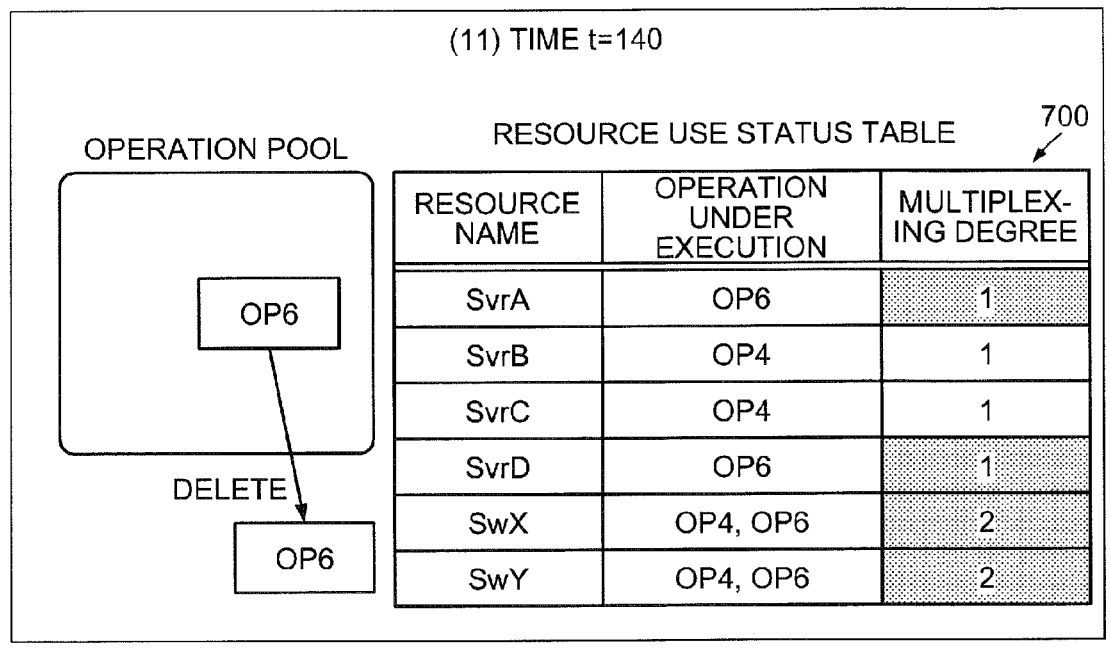
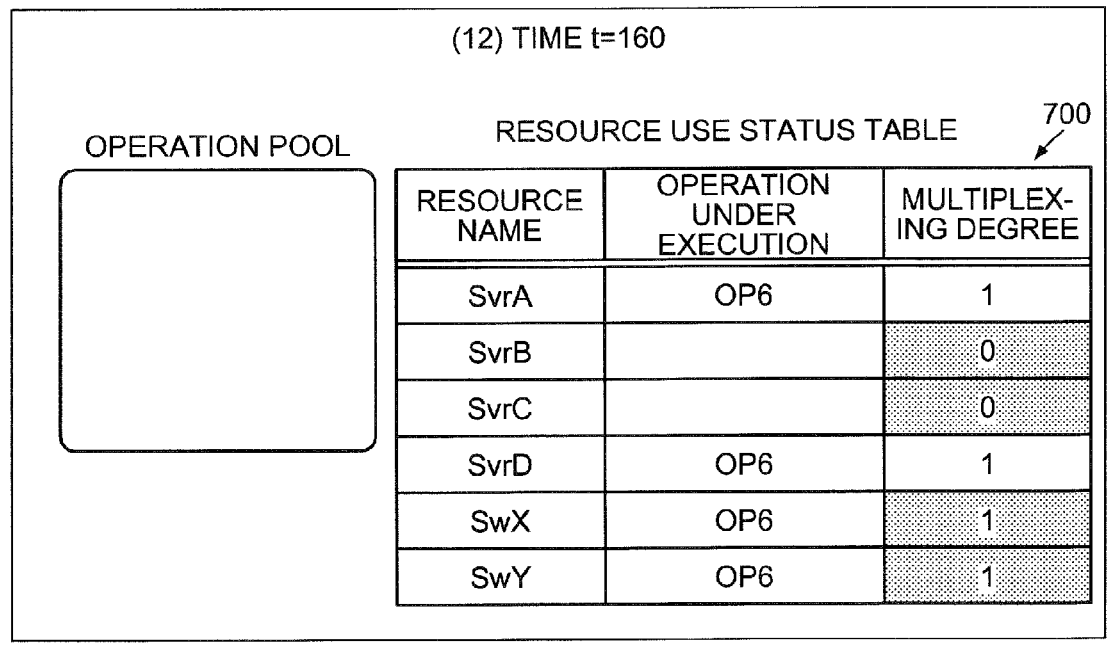

FIG.22

(13) TIME t=180

OPERATION POOL

RESOURCE USE STATUS TABLE 700

| RESOURCE NAME | OPERATION UNDER EXECUTION | MULTIPLEX-ING DEGREE |
|---|---|---|
| SvrA | | 0 |
| SvrB | | 0 |
| SvrC | | 0 |
| SvrD | | 0 |
| SwX | | 0 |
| SwY | | 0 |

ASSIGNING AN OPERATION TO A COMPUTING DEVICE BASED ON A NUMBER OF OPERATIONS SIMULTANEOUSLY EXECUTING ON THAT DEVICE

CROSS REFERENCE TO RELATED APPLICATIONS

This application is a continuation application of International Application PCT/JP2011/052667, filed on Feb. 8, 2011 and designating the U.S., the entire contents of which are incorporated herein by reference.

FIELD

The embodiment discussed herein is related to execution control.

BACKGROUND

Recently data centers are seeking to integrate virtual machines (VMs) on physical servers through virtualization to improve the use efficiency of resources (computing resources) and to obtain scale economic effects through scale enlargement.

On the other hand, accompanying the virtualization and increased scale of the system, operation management of the system is becoming complicated. For example, the virtualization needs additional operation management operations such as VM image management and migration control. Increases in scale are accompanied by increases in the frequency at which the operation management operations have to be performed. Related prior arts are described in Japanese Laid-Open Patent Publication Nos. 2002-024192 and 2005-293048 Patent Documents, for example.

Nonetheless, with conventional technologies, a problem arises in that resource load may increase consequent to the simultaneous occurrence of multiple operation management operations.

SUMMARY

According to an aspect of an embodiment, a computer-readable recording medium stores an execution control program causing a computer to execute a process that includes receiving an execution request for a given operation for a system; detecting number of operations that are of a type identical to that of the given operation and are under execution by a computing device that is in the system and involved in the execution of the given operation for which the execution request is received; comparing the number of operations detected at the detecting and the number of operations that are of the type and simultaneously executable by the computing device such that the execution of the given operation is completed within a given period by the computing device; and assigning the given operation to the computing device, based on a result of comparison at the comparing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory view of an example of the contents of a policy information table 300;

FIG. 6 is an explanatory view (1) of an example of the contents of a recommended multiplexing degree table 600;

FIG. 9 is an explanatory view of a specific example of log information;

FIGS. 10A, 10B, and 10C are explanatory views of a calculation example of a recommended multiplexing degree of an operation;

FIGS. 16, 17, 18, 19, 20, 21, and 22 are explanatory views of transitions of the resource use status.

DESCRIPTION OF EMBODIMENTS

Embodiments of an execution control program, an execution control device, and an execution control method according to the present invention will be described in detail with reference to the accompanying drawings.

Figure 1:
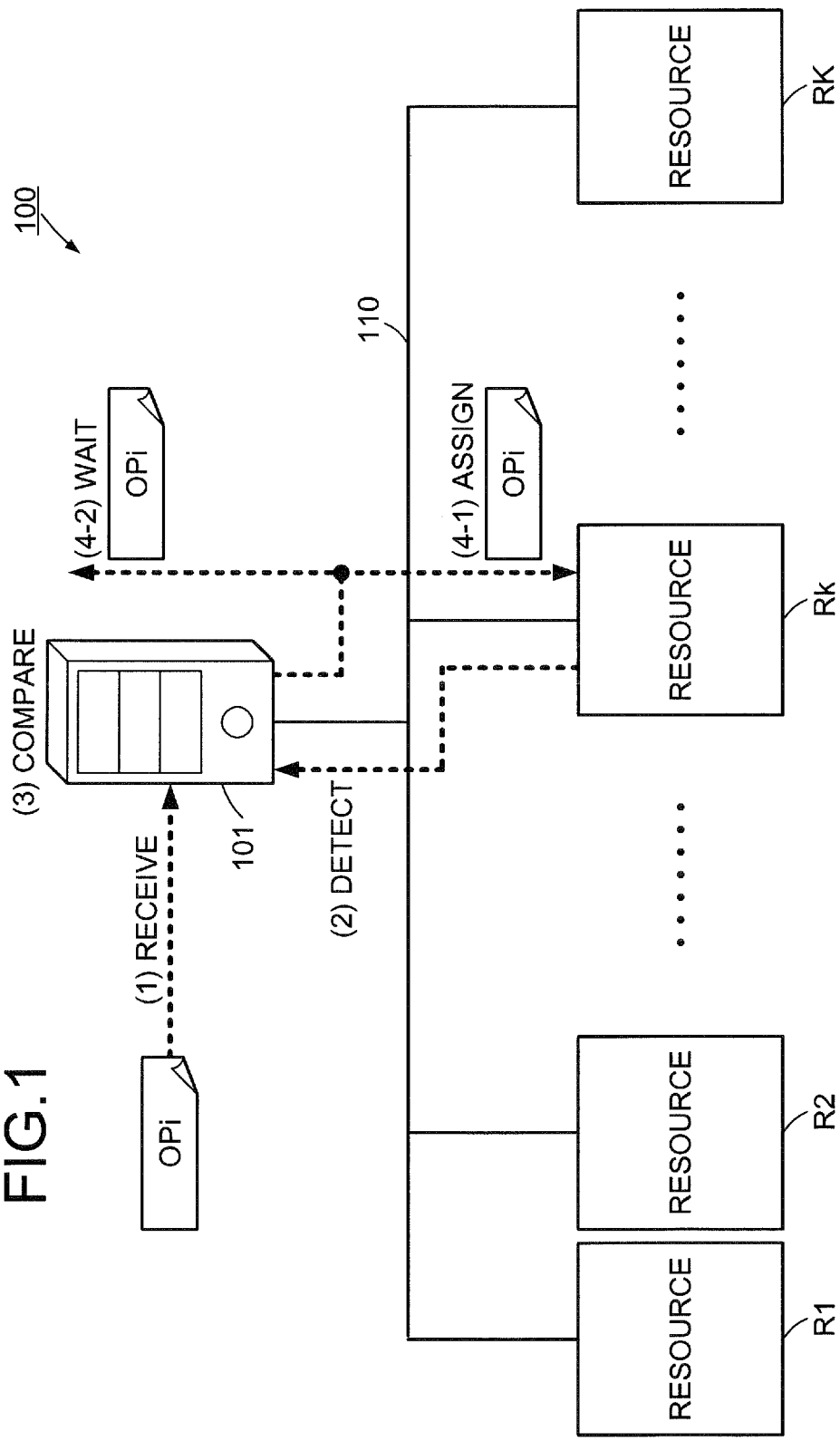
FIG. 1 is an explanatory view (1) of one example of a network system according to an embodiment.

FIG. 1 is an explanatory view (1) of one example of a network system according to an embodiment. In FIG. 1, a network system 100 includes an execution control device 101 and resources R1 to RK. In the network system 100, the execution control device 101 and the resources R1 to RK are connected via a network 110 such as a local area network (LAN), a wide area network (WAN), and Internet.

The execution control device 101 is a computer that controls the execution of operations for the network system 100. The resources R1 to RK are computing devices controlled by the execution control device 101. For example, the resources R1 to RK are elements of the network system 100, such as a physical server, network equipment (e.g., a switching device), a storage device, and a virtual machine (VM) on a physical server.

As used herein, an operation refers to a manipulation process for the operation management of the network system 100 and for example, refers to manipulation processes that are executed frequently and concurrently, such as a start, a restart, and an end of the VM; a live migration of the VM; a patching of an application running on the VM; and a change in the setting of network equipment.

Description will be given of an example of an execution control procedure effected by the execution control device 101 according to the embodiment. Among the resources R1 to RK, a resource relating to the execution of a given operation OPi is denoted as a "resource Rk" (k=1, 2, . . . , K). The resources R1 to RK are assumed to have the same processing performance.

(1) The execution control device 101 receives a request to execute an operation OPi for the network system 100.

(2) The execution control device 101 detects the number (hereinafter, "the multiplexing degree Nk of a resource Rk") of operations of the same type as that of the operation OPi under execution by the resource Rk involved in the execution of the operation OPi for which the execution request is received.

As used herein, the "type" of an operation is for classifying operations. For example, operations are classified according to process contents such as a start, a restart, and an end of the VM, a live migration of the VM, a patching of an application running on the VM, and a change in the setting of network equipment.

(3) The execution control device 101 compares the detected multiplexing degree Nk of the resource Rk and a recommended multiplexing degree Fi of the operation OPi. As used herein, the recommended multiplexing degree Fi of the operation OPi refers to the number of operations that are of the same type as the operation OPi and are simultaneously executable by the resource Rk such that the execution of the operation OPi is completed within a given period by the resource Rk.

The given period of the operation OPi can be set arbitrarily. For example, the given period of the operation OPi is set by an administrator of the network system 100 in consideration of operational requirements (such as the service level of a service provided to a customer) of the network system 100.

The recommended multiplexing degree Fi of the operation OPi may be set in advance or may be calculated from past results obtained by the execution of operations of the same type as that of the operation OPi by the resource Rk. The contents of specific processes for calculating the recommended multiplexing degree Fi of the operation OPi will be described later.

(4) The execution control device 101 assigns an operation OPi to a resource Rk based on a comparison result of the comparison.

For example, if the multiplexing degree Nk of the resource Rk is less than the recommended multiplexing degree Fi of the operation OPi, the execution control device 101 assigns the operation OPi to the resource Rk ((4-1) in the diagram). As a result, the resource Rk starts the execution of the operation OPi.

On the other hand, if the multiplexing degree Nk of the resource Rk is not less than the recommended multiplexing degree Fi of the operation OPi, the execution control device 101 does not assign the operation OPi to the resource Rk. In this case, the execution control device 101 waits for the completion of one or more operations of the same type under execution by the resource Rk, and repeats (2) to (4) described above ((4-2) in the diagram).

According to the execution control device 101 of the embodiment described above, the number of operations that are of the same type and simultaneously executed by the resource Rk can be controlled based on the recommended multiplexing degree of the operation for which the execution request is received. This enables the operation OPi to be assigned to the resource Rk so that the execution of the operation OPi is completed within the given period, thereby preventing a long processing time of the operation OPi and overload of the resource Rk.

Figure 2:
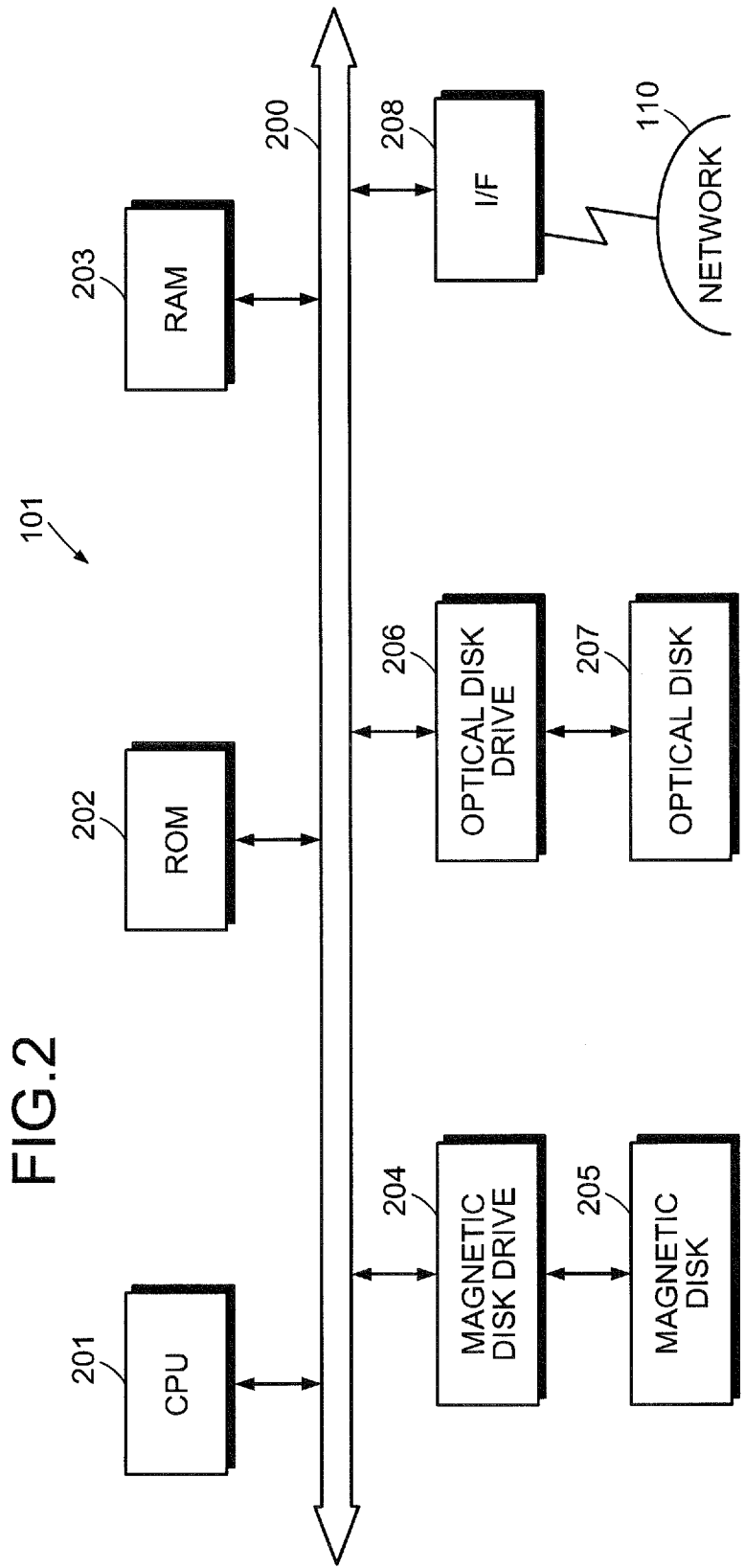
FIG. 2 is a block diagram of a hardware configuration of an execution control device according to the embodiment.

FIG. 2 is a block diagram of a hardware configuration of the execution control device according to the embodiment. As depicted in FIG. 2, the execution control device 101 includes a central processing unit (CPU) 201, read-only memory (ROM) 202, random access memory (RAM) 203, a magnetic disk drive 204, a magnetic disk 205, an optical disk drive 206, an optical disk 207, and an interface (I/F) 208, respectively connected by a bus 200.

The CPU 201 governs overall control of the execution control device 101. The ROM 202 stores therein programs such as a boot program. The RAM 203 is used as a work area of the CPU 201. The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer.

The I/F 208 is connected to a network 214 such as a local area network (LAN), a wide area network (WAN), and the Internet through a communication line and is connected to other apparatuses through the network 214. The I/F 208 administers an internal interface with the network 214 and controls the input/output of data from/to external apparatuses. For example, a modem or a LAN adaptor may be employed as the I/F 208.

In addition to the hardware configuration above, the execution control device 101 may further include input and output devices such as a display, a keyboard, a mouse, etc. The resources R1 to RK depicted in FIG. 1 are also implemented by a hardware configuration identical to that of the execution control device 101.

A policy information table 300 used by the execution control device 101 will be described. A policy information table 300 is stored in a storage device such as the ROM 202, the RAM 203, the magnetic disk 205, and the optical disk 207 depicted in FIG. 2, for example.

FIG. 3 is an explanatory view of an example of the contents of the policy information table 300. In FIG. 3, the policy information table 300 has policy information (e.g. policy information records 300-1 to 300-5) for each policy. Here, a policy means conditions to be satisfied at the time of execution of the operation OPi and specifies the time required for the completion of the operation OPi. For example, the policy information includes a policy name that identifies a policy and the contents of the policy.

In the case of the policy information record 300-1, for example, a policy P1 has a processing time for live migration (LM in FIG. 3) "within ((execution time at multiplexing degree "1")×2)" and "within 2 min". The processing time for live migration means the time required for the completion of live migration of the VM. The multiplexing degree is the number of operations that are of the same type and under execution at the same time. The execution time at the multiplexing degree "1" refers to the time required for the completion of live migration when the resource Rk executes the migration of the VM at the multiplexing degree "1".

In the case of the policy information record 300-2, for example, a policy P2 has a processing time for live migration "within (VM size [GB]×30 [sec])". The VM size is the memory size of the VM to be migrated.

As long as the contents of the policies are compatible with each other, plural policies may be combined by "and" or "or". In the case of the policy information 300-3 for example, a policy P3 is a combination of the policies P1 and P2 by "and".

Figure 4:
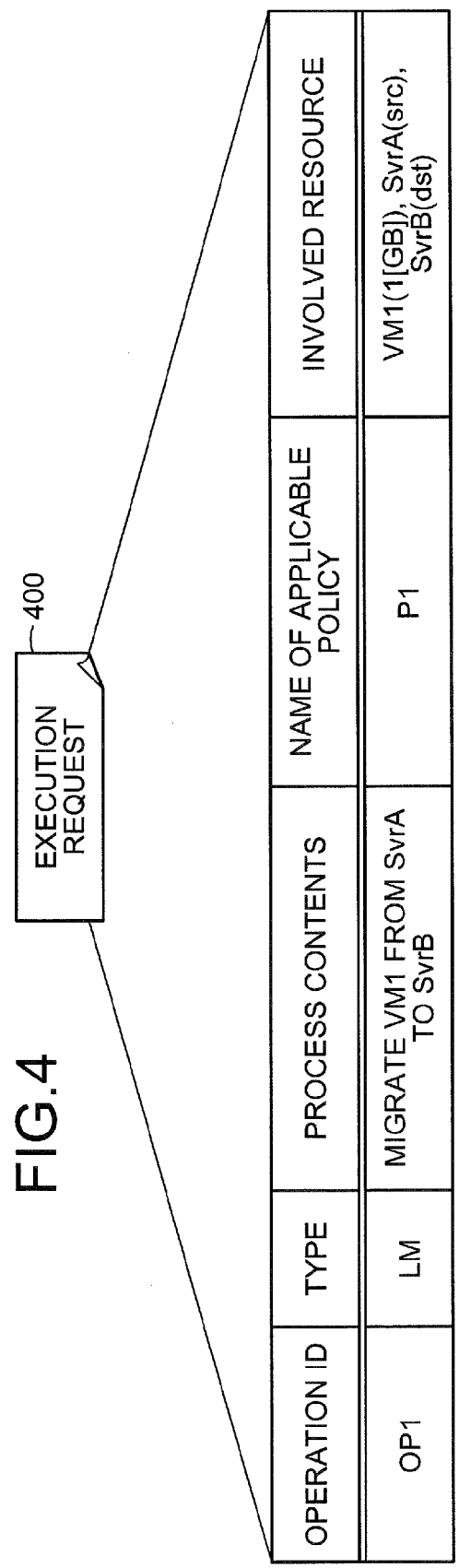
FIG. 4 is an explanatory view of a specific example of an operation execution request.

An operation OPi execution request received by the execution control device 101 will be described. FIG. 4 is an explanatory view of a specific example of an operation execution request. In FIG. 4, an execution request 400 includes information concerning an operation ID, the type, the process contents, the name of an applicable policy, and an involved resource.

The operation ID is an identifier of the operation OPi. The type is the type of the operation OPi. The process content is the process contents of the operation OPi. The name of the applicable policy is the name of a policy that is applied to the operation OPi. The involved resource is a resource Rk that is involved in the execution of the operation OPi.

For example, the execution request 400 includes the type "LM" of an operation OP1, the process contents "migrate VM1 from server A (SvrA) to SvrB", the name of the applicable policy "P1", and the involved resources "VM1 (1 [GB]), SvrA (src), SvrB (dst)". "VM1 (1 [GB]) means that the memory size of the VM1 is 1 [GB]. SvrA (src) means that the SvrA is a physical server and the migration source. SvrB (dst) means that the SvrB is a physical server and the migration destination.

Figure 5:
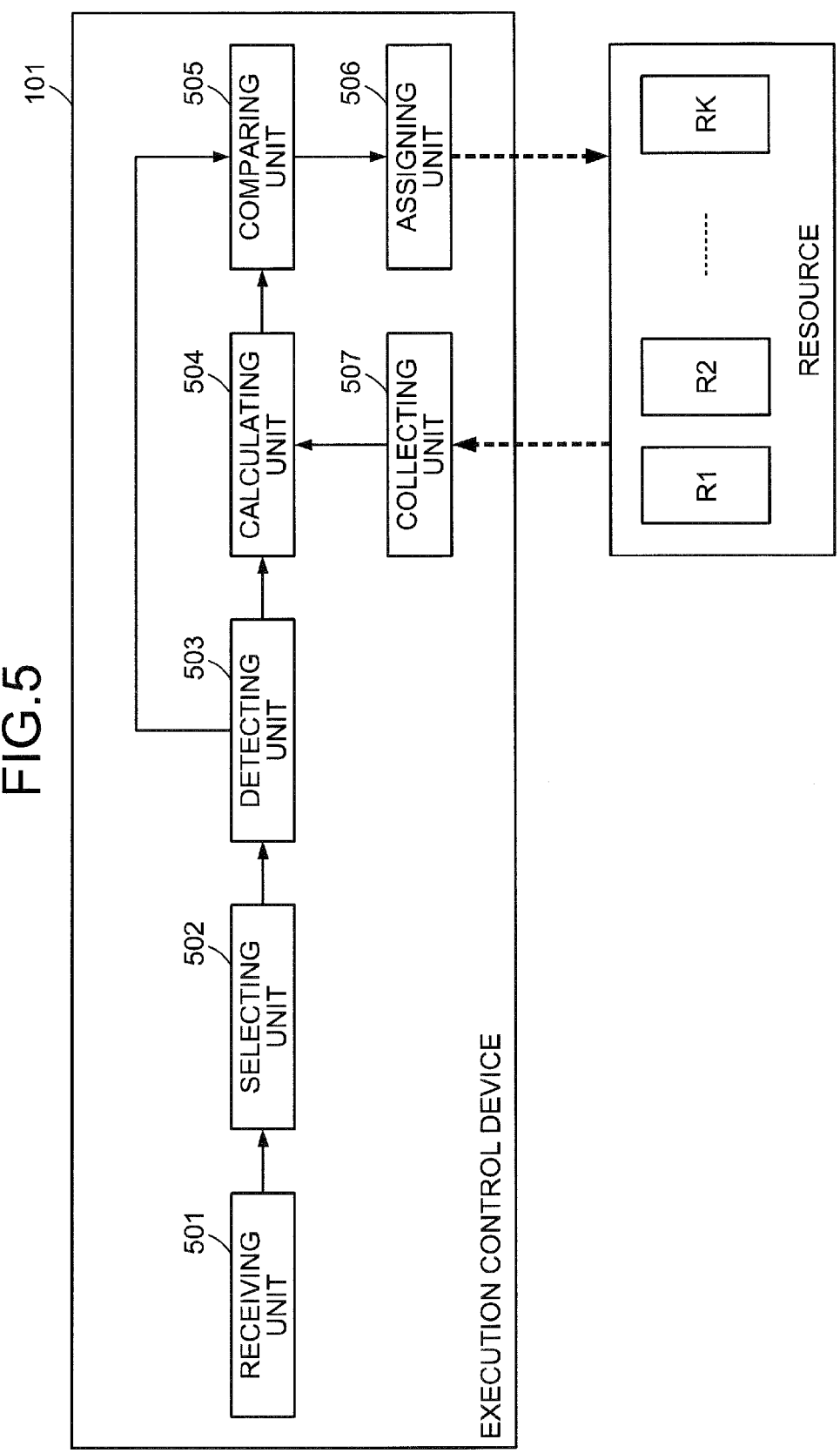
FIG. 5 is a block diagram of a functional configuration of the execution control device according to the embodiment.

A functional configuration example of the execution control device 101 will be described. FIG. 5 is a block diagram of a functional configuration of the execution control device according to the embodiment. In FIG. 5, the execution control device 101 is configured to include an receiving unit 501, a selecting unit 502, a detecting unit 503, a calculating unit 504, a comparing unit 505, an assigning unit 506, and a collecting unit. Functions (the receiving unit 501 to the collecting unit 507) forming a controlling unit are implemented for example by the I/F 208 or by executing on the CPU 201, a program stored in a storage device such as the ROM 202, the RAM 203, the magnetic disk 205, and the optical disk 207 depicted in FIG. 2.

The receiving unit 501 receives an execution request for a given operation OPi in the network system 100. Here, the execution request for the operation OPi includes, for example, the type of the operation OPi, the process contents, the execution conditions, and the name of the applicable policy. The execution conditions include, for example, information indicating the resource Ri involved in the execution of the operation OPi and the memory size of the VM.

For example, the receiving unit 501 receives an execution request (e.g. the execution request 400) for an operation OPi through user input via a keyboard (not depicted) or a mouse (not depicted). The receiving unit 501 may receive an execution request for the operation OPi from an external computer via the network 110.

The operation OPi for which the execution request has been received is entered in an operation pool, for example. The operation pool is a storage area for temporarily holding an operation OPi awaiting execution and is implemented, for example, by a storage device such as the RAM 203, the magnetic disk 205, and the optical disk 207 depicted in FIG. 2.

The selecting unit 502 selects an operation OPi for which an execution request has been received. For example, the selecting unit 502 may select the operations OPi in the order of receipt of the execution requests from the operation pool or may select the operations OPi in descending order of priority.

The detecting unit 503 detects the multiplexing degree Nk of a resource Rk involved in the execution of the selected operation OPi. As described above, the multiplexing degree Nk is the number of operations that are of the same type as the operation OPi and that are under execution by the resource Rk.

For example, the detecting unit 503 identifies a resource Rk involved in the execution of the operation OPi from the received execution request. In the example of the execution request 400 depicted in FIG. 4, VM1, SvrA, and SvrB are specified as resources Rk involved in the execution of the operation OP1.

The detecting unit 503 may make an inquiry to the identified resource Rk and inquire about the operations under operation, to thereby detect the multiplexing degree Nk of the resource Rk. Alternatively, the detecting unit 503 may refer to a resource use status table 700 depicted in FIG. 7 and described later, to detect the multiplexing degree Nk of the resource Rk. A detailed description of the resource use status table 700 will be given later with reference to FIG. 7.

The calculating unit 504 calculates the recommended multiplexing degree Fi of the operation OPi, based on load information of the resource Rk and on log information of operations that are of the same type as the operation OPi and that were executed by the resource Rk. Here, the load information of the resource Rk refers to a usage rate of a CPU or an input/output (I/O) device of the resource Rk. The execution control device 101 may make an inquiry to the resource Rk, to acquire the load information of the resource Rk.

The log information of operations that are of the same type as the operation OPi includes the execution results of the operations that are of the same type and that were executed by the resource Rk in the past. For example, the log information includes values of various parameters such as the execution conditions of an operation OPj executed by the resource Rk, the processing time thereof, and the multiplexing degree Nk and the load information of the resource Rk at the time of execution of the operation OPj.

For example, the calculating unit 504 performs regression analysis using the processing time of the operation OPj as an objective variable, the execution conditions of the operation OPj as well as the multiplexing degree Nk and the load information of the resource Rk at the time of execution of the operation OPj as a predictor variable, to thereby identify a relationship among the various parameters. The calculating unit 504 calculates the recommended multiplexing degree Fi that satisfies the policy applied to the operation OPi. Specific process contents of the calculating unit 504 will be described later with reference to FIGS. 8 to 10.

The acquired calculation result is entered into a recommended multiplexing degree table 600 depicted in FIG. 6. The recommended multiplexing degree table 600 is implemented by a storage device such as the RAM 203, the magnetic disk 205, and the optical disk 207, for example. The contents of the recommended multiplexing degree table 600 will be described.

FIG. 6 is an explanatory view (1) of an example of the contents of the recommended multiplexing degree table 600. In FIG. 6, the recommended multiplexing degree table 600 has fields of the type, the recommended multiplexing degree, and the conditions. Information is set into the fields, whereby recommended multiplexing degree information records 600-1 to 600-3 are stored.

The type is the type of the operation. The recommended multiplexing degree is the recommended multiplexing degree of the operation. The conditions are the conditions to be satisfied by the resources involved in the execution of the operation when the operation is executed in plural simultaneously at the recommended multiplexing degree.

For example, the recommended multiplexing degree information record 600-1 indicates a condition "(CPU≤25%) and (I/O≤25%) and (size≤1 GB)" when operations of the type "LM" are simultaneously executed at the recommended multiplexing degree "3". This condition indicates, for example, that the CPU usage rate of a resource involved in the execution of the operations is 25% or less, that the I/O usage rate thereof is 25% or less, and that the memory size of the VM to be migrated is 1 GB or less.

The recommended multiplexing degree information record 600-2, for example, indicates two conditions when operations of the type "LM" are simultaneously executed at the recommended multiplexing degree "2". This record indicates that only one of the two conditions connected by "or" need be satisfied when operations of the type "LM" are simultaneously executed at the recommended multiplexing degree "2".

The recommended multiplexing degree information record 600-3, for example, indicates a condition "other" when operations of the type "LM" are simultaneously executed at the recommended multiplexing degree "1". The condition "other" represents a condition other than the conditions indicated in the recommended multiplexing degree information record 600-1 and 600-2.

Although here an example is given in which the conditions to be satisfied by the resource are conditions common to the resources involved in the execution of the operation OPi, the conditions may be set for each of the resources involved in the execution of the operation OPi.

The reference of description returns to FIG. 5. The comparing unit 505 compares the detected multiplexing degree Nk of the resource Rk and the calculated recommended multiplexing degree Fi of the operation OPi. As described above, the recommended multiplexing degree Fi is the number of operations OPi that are of the same type and simultaneously executable by the resource Rk such that the execution of the operations OPi is completed within a given period by the resource Rk.

The assigning unit 506 assigns the operation OPi to the resource Rk, based on the acquired comparison result. For example, the assigning unit 506 assigns the operation OPi to the resource Rk, if the multiplexing degree Nk of each the resources Rk involved in the execution of the operation OPi is less than the recommended multiplexing degree Fi of the operation OPi.

On the other hand, the assigning unit 506 does not assign the operation OPi to the resource Rk if the multiplexing degree Nk of at least one of the resources Rk involved in the execution of the operation OPi is not less than the recommended multiplexing degree Fi of the operation OPi. This can prevent the execution of the operation OPi from not being completed within the time specified by the policy as a result of the assignment of the operation OPi to the resource Rk.

Figure 7:
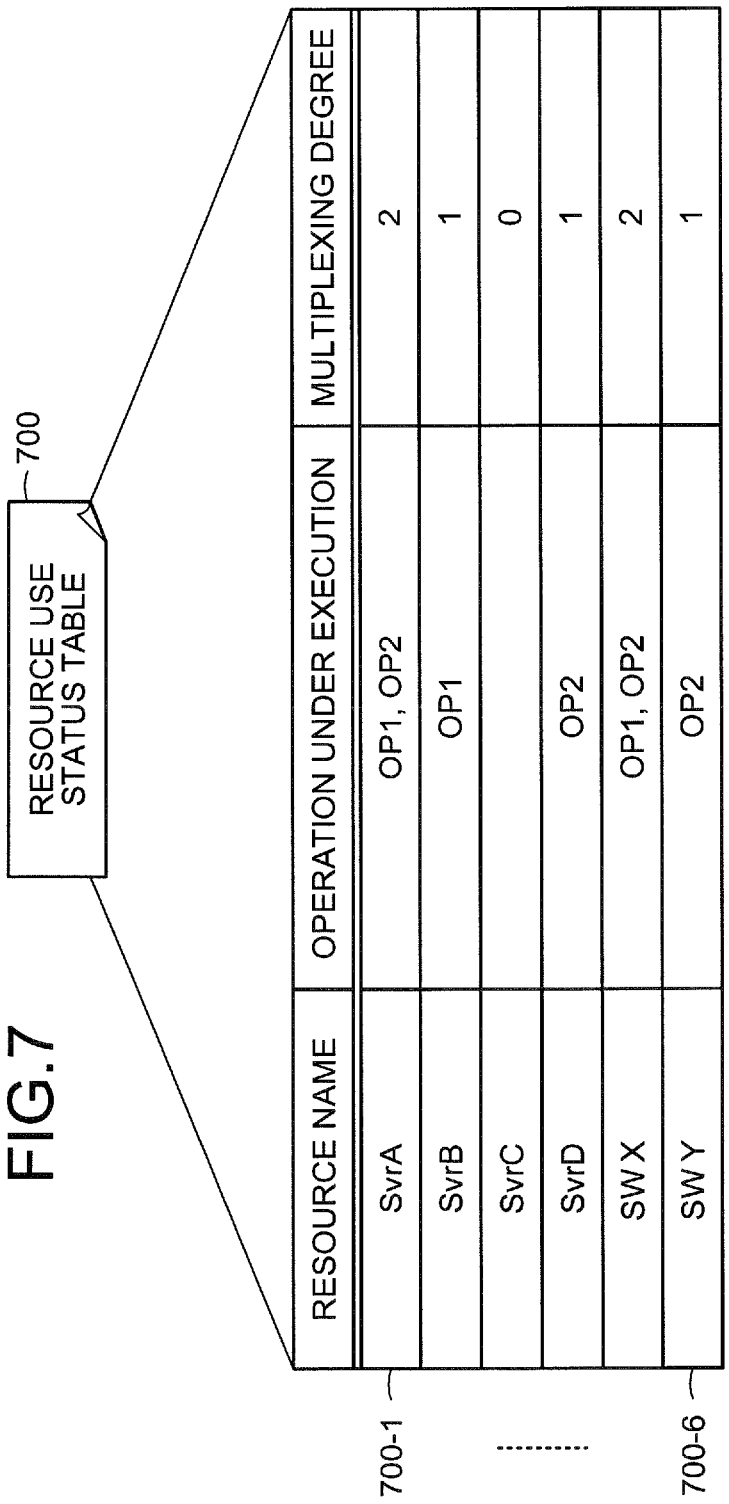
FIG. 7 is an explanatory view of an example of the contents of a resource use status table 700.

The acquired assignment result is stored to the resource use status table 700 depicted in FIG. 7, for example. The resource use status table 700 is implemented by a storage device such as the RAM 203, the magnetic disk 205, and the optical disk 207. The contents of the resource use status table 700 will be described.

FIG. 7 is an explanatory view of an example of the contents of the resource use status table 700. In FIG. 7, the resource use status table 700 has fields of resource name, operation under execution, and multiplexing degree. Information is set into the fields, whereby use status information records 700-1 to 700-6 for each resource Rk are stored.

The resource name is an identifier of the resource Rk. The operation under execution is an identifier of the operation OPi under execution by the resource Rk. The multiplexing degree is the number of operations that are of the same type as the operation OPi and that are simultaneously under execution by the resource Rk. The multiplexing degree Nk of the resource Rk is incremented when the operation OPi is assigned to the resource Rk and is decremented when the execution of the operation OPi is completed by the resource Rk.

For example, the use status information record 700-1 indicates that "SvrA" is executing "operations OP1 and OP2" at the multiplexing degree "2". The use status information record 700-6 indicates that "SW (switching device) Y is executing "operation OP2" at the multiplexing degree "1".

The detecting unit 503 can detect the multiplexing degree Nk of the resource Rk by referring to the resource use status table 700. For example, when the resource Rk is "SvrA", the detecting unit 503 can detect the multiplexing degree "2" of the SvrA by referring to the resource use status table 700.

The resource use status table 700 is created for each type of operation, for example. The resource use status table 700 preliminarily stores all resources Rk involved in the execution of the operations of the type "LM", for example, among the resources R1 to Rk.

The reference of description returns to FIG. 5. When the resource Rk is executing an operation OPj of the same type as the operation OPi, the comparing unit 505 may compare the detected multiplexing degree Nk of the resource Rk and a recommended multiplexing degree Fj of the operation OPj. The recommended multiplexing degree Fi of the operation OPj is calculated prior to the assignment of the operation OPj to the resource Rk, for example.

The assigning unit 506 may assign the operation OPi to the resource Rk, based on the result of comparison between the multiplexing degree Nk of the resource Rk and the recommended multiplexing degree Fj of the operation OPj. For example, the assigning unit 506 assigns the operation OPi to the resources Rk, if the multiplexing degree Nk is less than the recommended multiplexing degree Fj of the operation OPj, for each of the resources Rk involved in the execution of the operation OPi.

On the other hand, the assigning unit 506 does not assign the operation OPi to the resource Rk, if the multiplexing degree Nk is not less than the recommended multiplexing degree Fj of the operation OPj, for at least one of the resources Rk involved in the execution of the operation OPi. That is, in the case of the presence of the operation OPj already assigned to the resource Rk, if the multiplexing degree Nk of the resource Rk exceeds the recommended multiplexing degree Fj of the operation OPj as a result of assignment of a new operation OPi, the assignment of the operation OPi is not performed. This can prevent the execution of the operation OPj from not being completed within the time specified by the policy, consequent to the assignment of the operation OPi to the resource Rk.

The collecting unit 507 receives from the resource Rk, log information of the operation OPi executed by the resource Rk consequent to the assignment of the operation OPi to the resource Rk. When the log information of the operation OPi is received, the multiplexing degree Nk of the corresponding resource Rk in the resource use status table 700 is decremented.

By using the log information of the received operation OPi, the calculating unit 504 may calculate the recommended multiplexing degree of the operations that are of the same type as the operation OPi. This enables the recommended multiplexing degree Fi of the operation OPi to be calculated through the feedback of the execution result of the operations of the same type as the operation OPi at each resource Rk.

Although the recommended multiplexing degree Fi of the operation OPi is calculated in the above description, configuration is not limited hereto. For example, the administrator of the network system 100 may decide the recommended multiplexing degree Fi of each operation OPi and enter each recommended multiplexing degree Fi into the recommended multiplexing degree table 600.

A specific process contents of the calculating unit 504 will be described. Taking the resource Rk in a given load state as an example, an example of the contents of a process of calculating the recommended multiplexing degree Fi of the operation OPi will be described. Here, the type of the operation OPi is "LM".

Figure 8:
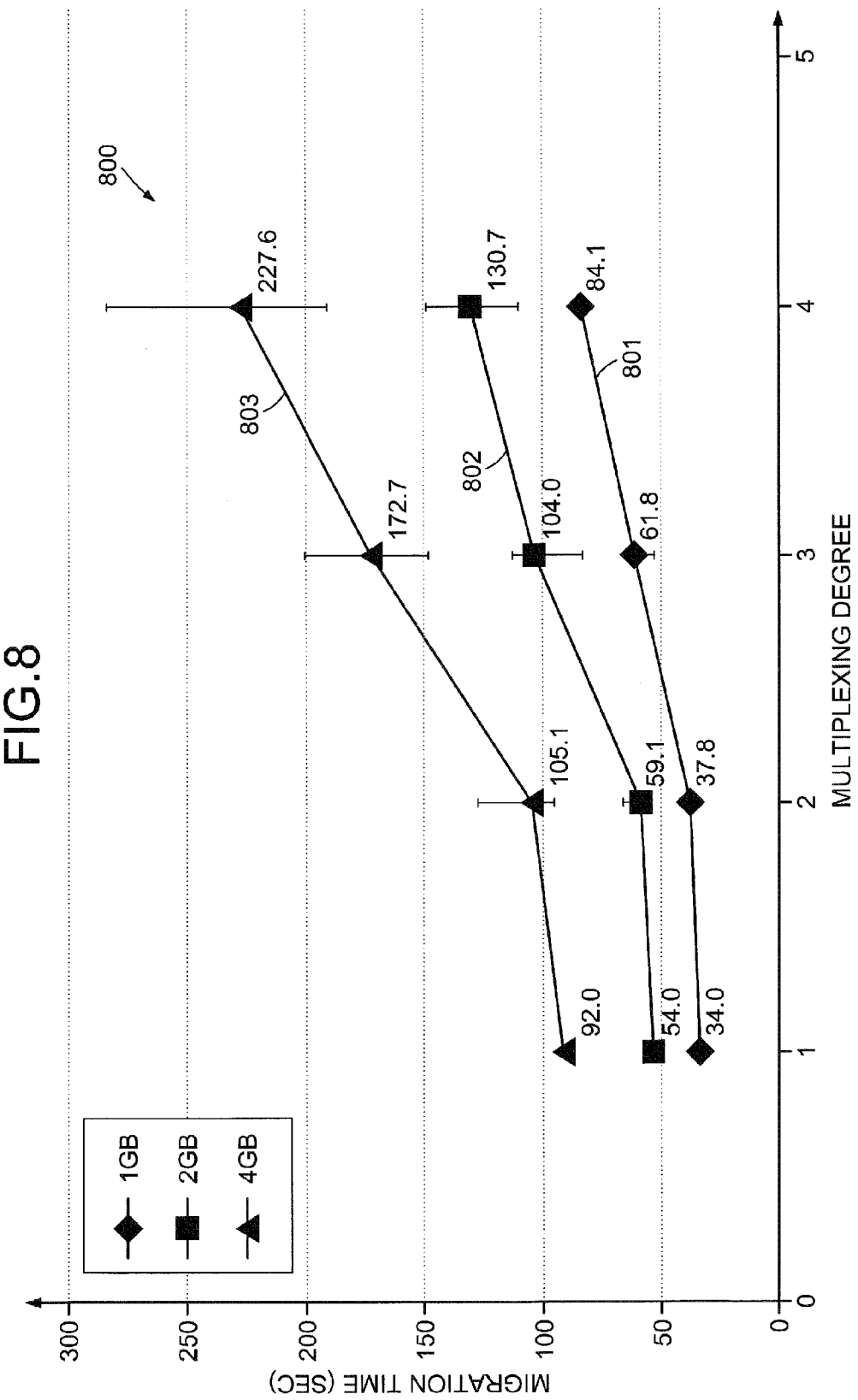
FIG. 8 is an explanatory view of the migration time for a given load state.

FIG. 8 is an explanatory view of the migration time for a given load state. In FIG. 8, curves 801 to 803 are shown on a coordinate system 800, in which a vertical axis represents the migration time [sec] and a horizontal axis represents the multiplexing degree.

The curve 801 shows a relationship between the multiplexing degree Nk of the resource Rk and the migration time when the migration of the VM having a VM size of 1 [GB] is performed at the resource Rk, in a given load state. The migration time is the time required for the completion of the migration of the VM.

The curve 802 shows a relationship between the multiplexing degree Nk of the resource Rk and the migration time when the migration of the VM having a VM size of 2 [GB] is executed at the resource Rk. The curve 803 shows a relationship between the multiplexing degree Nk of the resource Rk and the migration time when the migration of the VM having a VM size of 4 [GB] is executed at the resource Rk.

A case is assumed where the live migration of the VM is performed in compliance with the policy P1 depicted in the policy information table 300.

For the resource Rk, the execution time is 34 [sec] for executing the migration of the VM having a VM size of 1 [GB], at the multiplexing degree "1". Thus, the policy P1 is "within 68 [sec]". In this case, the recommended multiplexing degree Fi is "3" for the operation OPi performing the live migration of the VM having a VM size of 1 [GB].

For the resource Rk, the execution time is 54 [sec] for executing the migration of the VM having a VM size of 2 [GB], at the multiplexing degree "1". Thus, the policy P1 is "within 108 [sec]". In this case, the recommended multiplexing degree Fi is "3" for the operation OPi performing the live migration of the VM having a VM size of 2 [GB].

For the resource Rk, the execution time is 92 [sec] for executing the migration of the VM having a VM size of 4 [GB], at the multiplexing degree "1". Thus, the policy P1 is "within 120 [sec]". In this case, the recommended multiplexing degree Fi is "2" for the operation OPi performing the live migration of the VM having a VM size of 4 [GB].

The calculating unit 504 calculates the recommended multiplexing degree Fi of the operation OPi, based on the log information of operations that are of the same type as the operation OPi and that are executed by the resource Rk. An example of more specific process contents will be described. The type of the operation OPi is "LM".

FIG. 9 is an explanatory view of a specific example of the log information. In FIG. 9, the log information 900 has logs L1 to L7 for operations OP1 to OP7 that are of the type "LM" and that are executed by the resource Rk involved in the execution of the operation OPi.

For example, the logs L1 to L7 each include an operation ID, the type, a VM ID, the VM size, the multiplexing degree, the processing time, and load information. The operation ID is an identifier of an operation. The type is the type of the operation. The VM ID is an identifier of a VM to be migrated. The VM size is the memory size of the VM to be migrated.

The multiplexing degree is the multiplexing degree of the resource Rk at the time of the execution of the operation. The processing time is the time required for the completion of the execution of the operation. The load information is the usage rates of the CPU and the I/O by the resource Rk at the time of the execution of the operation. In this case, shown in an extractive manner are the usage rates of the CPU and the I/O by any one of resources Rk involved in the execution of the operation.

In the case of a log L1, for example, the operation OP1 is the live migration of the VM1 having a VM size of 1 [GB], executed at the multiplexing degree "3". The processing time of the operation OP1 is 20 [sec] and usage rates of the CPU and the I/O by the resource Rk are 20 [%] and 10 [%], respectively.

A case is assumed where the recommended multiplexing degree Fi of the operation OPi performing the live migration of the VM is calculated in compliance with the policy P2 depicted in the policy information table 300.

FIGS. 10A, 10B, and 10C are explanatory views of a calculation example of the recommended multiplexing degree of an operation. In FIGS. 10A, 10B, and 10C, depicted is the log information 900 (L1 to L7) of the operations that are of the same type as the operation OPi (see FIG. 10A).

The calculating unit 504 extracts logs conforming to the policy P2, from among the logs L1 to L7 of the log information 900 (see FIG. 10B). In this case, the logs L1, L2, L5, L6, and L7 conforming to the policy P2 are extracted, from among the logs L1 to L7.

In the case of the log L1, for example, the policy P2 is "within 30 [sec]" due to the VM size of the log L1 being 1 [GB]. Since the processing time of the log L1 is 20 [sec], the log L1 conforms to the policy P2. In the case of the log L3, for example, the policy P2 is "within 30 [sec]" due to the VM size of the log L3 being 1 [GB]. Since the processing time of the log L3 is 60 [sec], the log L3 does not conform to the policy P2.

The calculating unit 504 identifies a log that indicates the highest usage rates of the CPU and the I/O, for each paired VM size and multiplexing degree. For the paired VM size "1" and multiplexing degree "2", the log L6 indicating the highest usage rates of the CPU and the I/O is identified. For the paired VM size "1" and multiplexing degree "3", the log L5 indicating the highest usage rates of the CPU and the I/O is identified. For the paired VM size "2" and multiplexing degree "2", the log L2 indicating the highest usage rates of the CPU and the I/O is identified.

For each pair of VM size and multiplexing degree, the calculating unit 504 sets the multiplexing degree of the identified log as the recommended multiplexing degree of the operations of the type "LM" and employs the VM size and the usage rates of the CPU and the I/O of the log as conditions (see FIG. 10C). The conditions refer to conditions to be satisfied by the resource Rk when the operations of the type "LM" are simultaneously executed at the recommended multiplexing degree.

In this case, as a result of the identification of the log L5 for the paired VM size "1" and multiplexing degree "3", the recommended multiplexing degree information record 600-1 is entered into the recommended multiplexing degree table 600. As a result of the identification of the log L6 for the paired VM size "1" and multiplexing degree "2 and as a result of the identification of the log L2 for the paired VM size "2" and multiplexing degree "2, the recommended multiplexing degree information record 600-2 is entered into the recommended multiplexing degree table 600. For the paired VM size "All" and multiplexing degree "1", the recommended multiplexing degree information record 600-3 is entered into the recommended multiplexing degree table 600. The VM size "All" represents an arbitrary memory size.

The calculating unit 504 refers to the recommended multiplexing degree table 600 to identify the recommended multiplexing degree Fi of the operation OPi corresponding to the load information of the current resource Rk. The load information of the resource Rk is, for example, the usage rates of the CPU and the I/O, the VM size of the VM to be migrated, etc. The load information is received from the resource Rk by the collecting unit 507, for example.

For example, a case is assumed where the usage rates of the CPU and the I/O by all the resources Rk involved in the execution of the operation OPi is 25 [%] or less, and the VM size of the VM to be migrated is 1 [GB] or less. In this case, the recommended multiplexing degree Fi of the operation OPi is "3", based on the recommended multiplexing degree information record 600-1.

A case is assumed where the usage rate of the CPU by all the resources Rk involved in the execution of the operation OPi is more than 25 [%] and not more than 30 [%], the usage rate of the I/O is more than 25 [%] and not more than 40 [%], and the VM size is 1 [GB] or less. In this case, the recommended multiplexing degree Fi of the operation OPi is "2", based on the recommended multiplexing degree information record 600-2.

A case is assumed where the usage rate of the CPU by all the resources Rk involved in the execution of the operation OPi is not more than 40 [%], the usage rate of the I/O is not more than 20 [%], and the VM size is more than 1 [GB] and not more than 2 [GB]. In this case, the recommended multiplexing degree Fi of the operation OPi is "2", based on the recommended multiplexing degree information record 600-2.

In a case where the usage ratios of the CPU and the I/O by at least one of the resources involved in the execution of the operation OPi is other than the above conditions and where the VM size is other than the above conditions, the recommended multiplexing degree Fi of the operation OPi is "1", based on the recommended multiplexing degree information record 600-3.

(Recommended Multiplexing Degree Fi-k for Each Resource Rk)

Although the above description is given of the case where for the operation OPi for which an execution request has been received, the recommended multiplexing degree Fi is calculated on the assumption that the resources R1 to RK have the same processing performance, the calculation is not limited hereto. For example, a case is assumed where the resources R1 to Rk have respectively different process performances. In this case, the recommended multiplexing degree Fi of the operation OPi may be calculated for each of the resources involved in the execution of the operation OPi.

Here, in the description, the resources involved in the execution of the operation OPi are denoted as "resources R(1) to R(M)" and any one of the resources R(1) to R(M) is denoted as "resource R(m)" (m=1, 2, . . . , m). The recommended multiplexing degree of the operation OPi for the resource R(m) is denoted as "recommended multiplexing degree Fi-m".

For example, the calculating unit 504 calculates the recommended multiplexing degree Fi-m of the operation OPi for each resource R(m) based on the load information of the resource R(m) and on the log information of operations of the same type as the operation OPi that are executed by the resource R(m).

The comparing unit 505 compares for each resource R(m), a multiplexing degree N(m) of the resource R(m) and a minimum recommended multiplexing degree $Fi_{min}$ among calculated recommended multiplexing degrees Fi-1 to Fi-M. The assigning unit 506 then assigns the operation OPi to the resources R(1) to R(M) based on the comparison result for each resource R(m).

For example, the assigning unit 506 assigns the operation OPi to the resources R(1) to R(M) if the multiplexing degrees N(1) to N(M) of all the resources R(1) to R(M) are less than the recommended multiplexing degree $Fi_{Min}$. Thus, the recommended multiplexing degree $Fi_{Min}$ becomes the recommended multiplexing degree Fi of the operation OPi.

Figure 11:
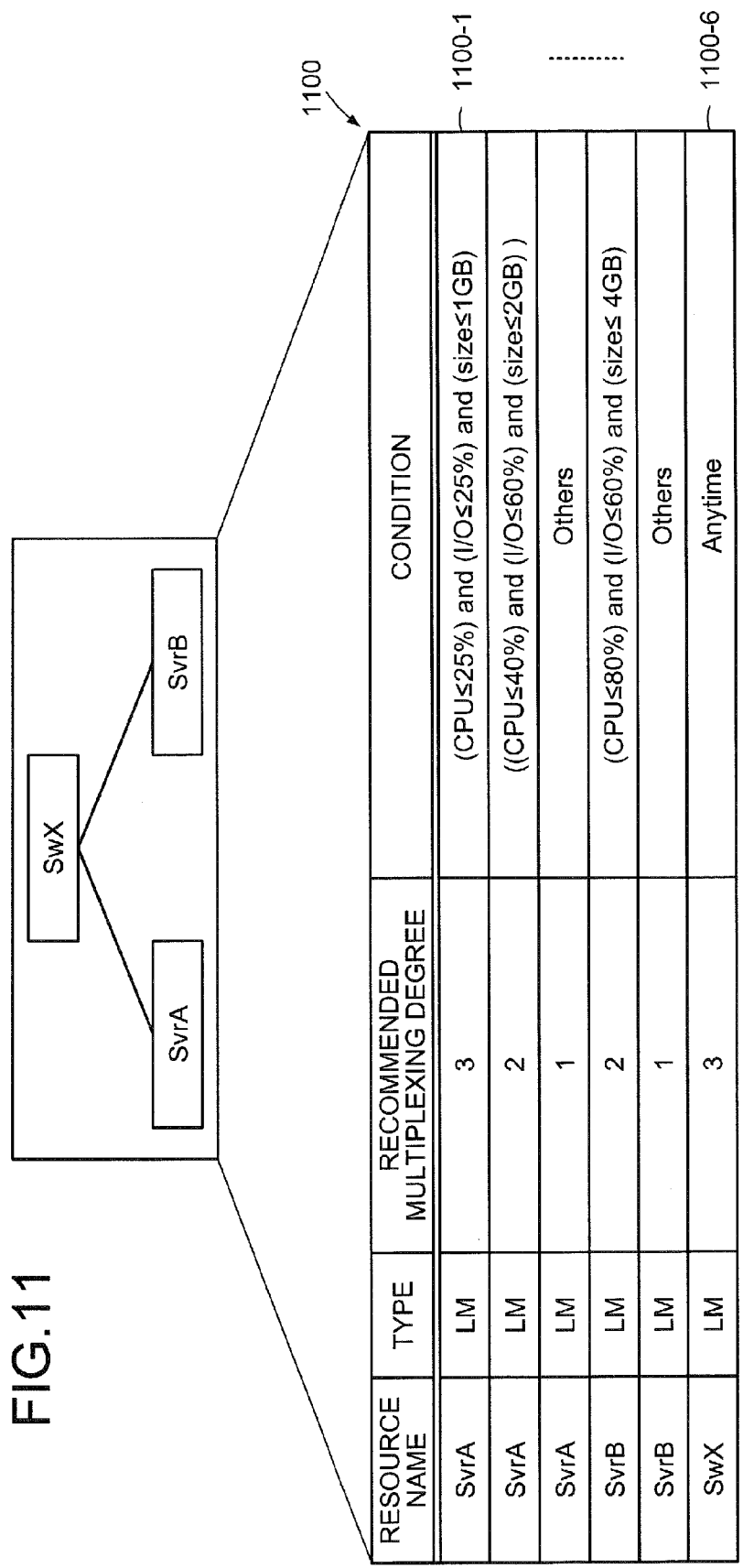
FIG. 11 is an explanatory view of an example of the contents of a recommended multiplexing degree table in a case of setting for each resource, a recommended multiplexing degree of operations.

FIG. 11 is an explanatory view of an example of the contents of the recommended multiplexing degree table in a case of setting the recommended multiplexing degree of the operations for each resource. In FIG. 11, SvrA and SvrB and SwX denote resources Rk involved in the execution of the operation OPi for which an execution request has been received.

The operation OPi performs the migration of the VM from SvrA to SvrB via SwX. A recommended multiplexing degree table 1100 indicates recommended multiplexing degree information records 1100-1 to 1100-6 for each resource (SvrA, SvrB, SwX) involved in the execution of the operation OPi.

The recommended multiplexing degree information records 1100-1 to 1100-3 represent the recommended multiplexing degree of the operation OPi for the SvrA. The recommended multiplexing degree of the operation OPi for the SvrA is calculated by the calculating unit 504, based on the log information of the operations that are of the same type as the operation OPi and executed by the SvrA.

The recommended multiplexing degree information records 1100-4 and 1100-5 represent the recommended multiplexing degree of the operation OPi for the SvrB. The recommended multiplexing degree of the operation OPi for the SvrB is calculated by the calculating unit 504, based on the log information of the operations that are of the same type as the operation OPi and executed by the SvrB.

The recommended multiplexing degree information record 1100-6 represents the recommended multiplexing degree of the operation OPi for the SwX. The recommended multiplexing degree of the operation OPi for the SwX is calculated by the calculating unit 504, based on the log information of the operations that are of the same type as the operation OPi and executed by the SwX.

The usage rates of the CPU and the I/O by the SvrA are assumed as 10 [%] and 20 [%], respectively, and the usage rates of the CPU and the I/O by the SvrB are assumed as 20 [%] and 50 [%], respectively. In this case, for example, the recommended multiplexing degrees for the resources (SvrA, SvrB, SwX) of the operation OPi performing the live migration of the VM having a VM size of 1 [GB] are (3, 2, 3). Thus, the recommended multiplexing degree Fi of the operation OPi is "2" (=Min(3, 2, 3)).

The usage rates of the CPU and the I/O by the SvrA are assumed as 30 [%] and 50 [%], respectively, and the usage rates of the CPU and the I/O by the SvrB are assumed 20 [%] and 50 [%], respectively. In this case, for example, the recommended multiplexing degrees for the resources (SvrA, SvrB, SwX) of the operation OPi performing the live migration of the VM with the VM size of 4 [GB] are (1, 2, 3). Thus, the recommended multiplexing degree Fi of the operation OPi is "1" (=Min(1, 2, 3)).

This enables the recommended multiplexing degree Fi of the operation OPi to be calculated on the assumption that the resources R1 to RK have respectively different process performances. For example, the recommended multiplexing degree Fi of an operation OPi is set to the recommended multiplexing degree of a resource Rk having the lowest process performance among resources Rk involved in the execution of the operation OPi, whereby the execution of the operation OPi can be prevented from not being completed in a time specified by the policy.

Figure 12:
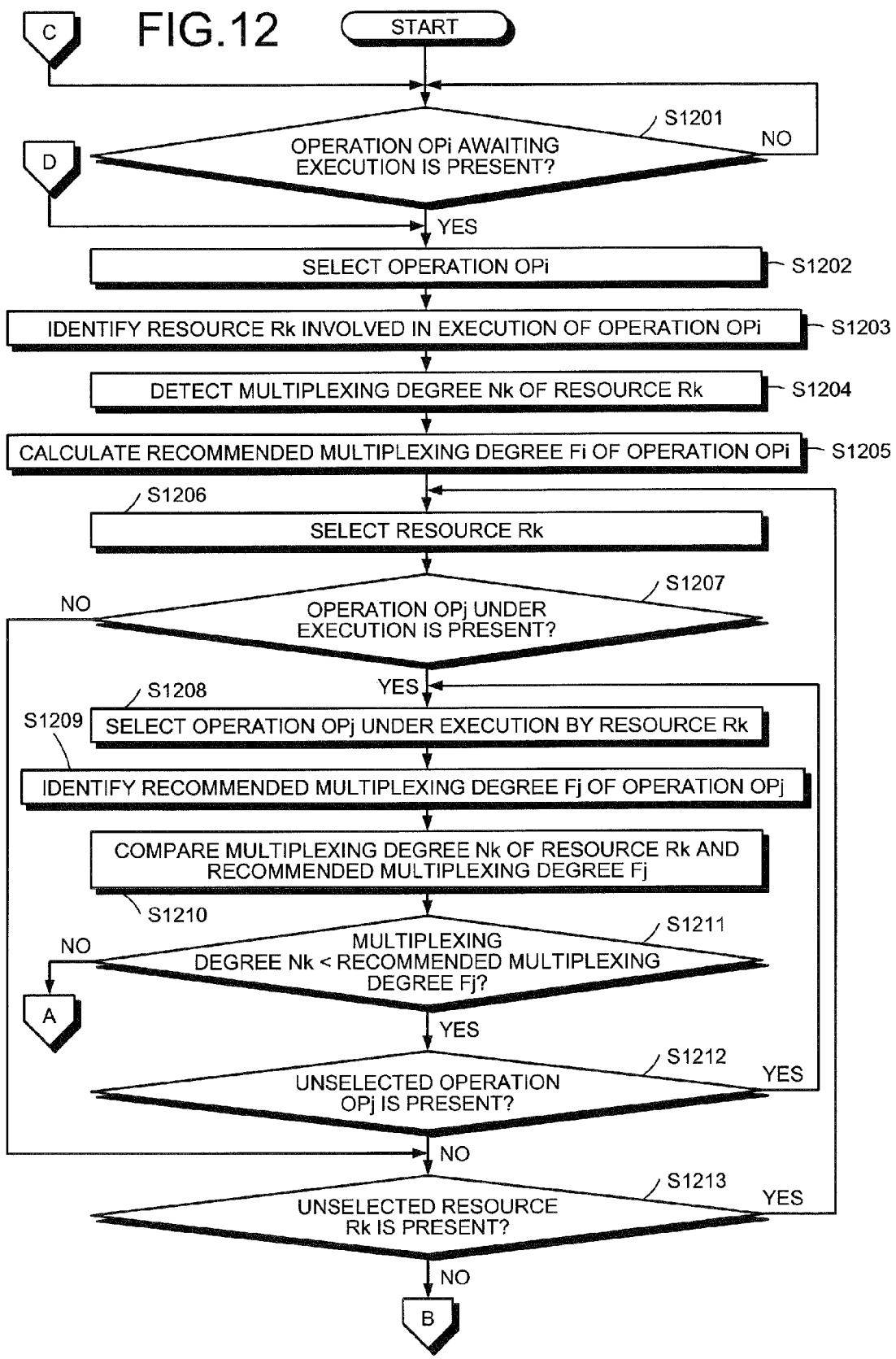
FIGS. 12 and 13 are flowcharts of an example of an execution control procedure effected by the execution control device according to the embodiment.
Figure 13:
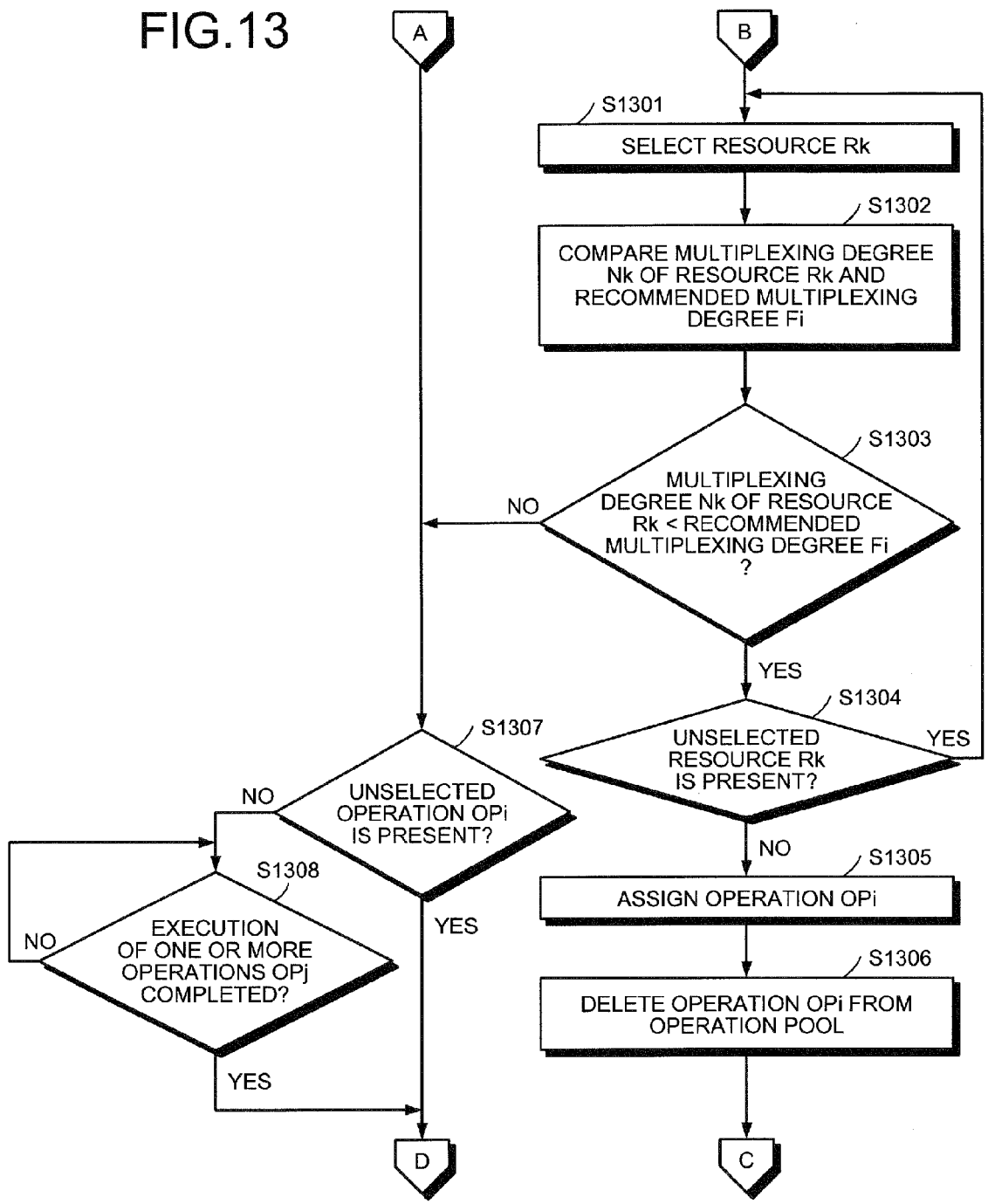

An execution control procedure of the execution control device 101 according to the embodiment will be described. FIGS. 12 and 13 are flowcharts of an example of the execution control procedure effected by the execution control device according to the embodiment. In the flowchart of FIG. 12, the selecting unit 502 first determines whether an operation OPi awaiting execution is present in the operation pool (step S1201).

If no operation OPi awaiting execution is present in the operation pool (step S1201: NO), the receiving unit 501 waits the entry of an operation OPi in the operation pool. On the other hand, if an operation OPi awaiting execution is present (step S1201: YES), the selecting unit 502 selects the operation OPi from the operation pool (step S1202).

The detecting unit 503 identifies from among the resources R1 to RK, a resource Rk involved in the execution of the selected operation OPi (step S1203). The detecting unit 503 then detects the multiplexing degree Nk of the identified resource Rk (step S1204).

The calculating unit 504 calculates the recommended multiplexing degree Fi of the operation OPi, based on the load information of the identified resource Rk and on the log information of operations that are of the same type as the operation OPi and executed by the resource Rk (step S1205). The comparing unit 505 selects a resource Rk involved in the execution of the selected operation OPi (step S1206).

The comparing unit 505 determines whether an operation OPj under execution by the selected resource Rk is present (step S1207). If no operation OPj under execution is present (step S1207: NO), the procedure goes to step S1203.

On the other hand, if an operation OPj under execution is present (step S1207: YES), the comparing unit 505 selects the operation OPj under execution by the selected resource Rk (step S1208). The comparing unit 505 then identifies the recommended multiplexing degree Fj of the selected operation OPj (step S1209). The recommended multiplexing degree Fj of the operation OPi is calculated prior to the start of the execution and is stored in the RAM 203 for example.

The comparing unit 505 compares the multiplexing degree Nk of the selected resource Rk and the identified recommended multiplexing degree Fj of the operation OPj (step S1210). The assigning unit 506 determines whether the multiplexing degree Nk of the resource Rk is less than the recommended multiplexing degree Fj of the operation OPj (step S1211).

If the multiplexing degree Nk of the resource Rk is not less than the recommended multiplexing degree Fj of the operation OPj (step S1211: NO), the procedure goes to step S1307 depicted in FIG. 13. On the other hand, if the multiplexing degree Nk is less than the recommended multiplexing degree Fj (step S1211: YES), the comparing unit 505 determines whether an unselected operation OPj not yet selected is present among the operations OPj under execution by the resource Rk (step S1212).

If an unselected operation OPj is present (step S1212: YES), the procedure returns to step S1208. On the other hand, if no unselected operation OPj is present (step S1212: NO), the comparing unit 505 determines whether an unselected resource Rk not yet selected is present among the resources Rk involved in the execution of the operation OPi (step S1213).

If an unselected resource Rk is present (step S1213: YES), the procedure returns to step S1206. On the contrary, if no unselected resource Rk is present (step S1213: NO), the procedure goes to step 1301 depicted in FIG. 13.

In the flowchart depicted in FIG. 13, the comparing unit 505 selects a resource Rk involved in the execution of the operation OPi selected at step S1202 in FIG. 12 (step S1301). Subsequently, the comparing unit 505 compares the multiplexing degree Nk of the selected resource Rk and the recommended multiplexing degree Fi of the selected operation OPi (step S1302).

The assigning unit 506 then determines whether the multiplexing degree Nk of the resource Rk is less than the recommended multiplexing degree Fi of the operation OPi (step S1303). If the multiplexing degree Nk of the resource Rk is less than the recommended multiplexing degree Fi of the operation OPi (step S1303: YES), the comparing unit 505 determines whether an unselected resource Rk not yet selected is present among resources Rk involved in the execution of the operation OPi (step S1304).

If an unselected resource Rk is present (step S1304: YES), the procedure returns to step S1301. On the other hand, if no unselected resource Rk is present (step S1304: NO), the assigning unit 506 assigns the selected operation OPi to the resource Rk (step S1305). The assigning unit 506 deletes the assigned operation OPi from the operation pool (step S1306), returning to step S1201 depicted in FIG. 12.

If at step S1303, the multiplexing degree Nk of the resource Rk is not less than the recommended multiplexing degree Fi of the operation OPi (step S1303: NO), the selecting unit 502 determines whether an unselected operation OPi not yet selected is present among the execution-wait operations OPi (step S1307).

If an unselected operation OPi is present (step S1307: YES), the procedure returns to step S1202 depicted in FIG. 12. On the other hand, if no unselected operation OPi is present (step S1307: NO), the selecting unit 502 determines whether the selected resource Rk has completed the execution of one or more operations OPj (step S1308).

The selecting unit 502 waits for the completion of the execution of the one or more operations OPj (step S1308: NO) and when completed (step S1308: YES), the procedure goes to step S1202 depicted in FIG. 12.

This enables the operation OPi to be assigned to the resource Rk so that the execution of the operation OPi is completed within the time specified by the policy. The operation OPi can be assigned to the resource Rk so that the execution of the operation OPj under execution by the resource Rk is completed within the time specified by the policy.

Figure 14:
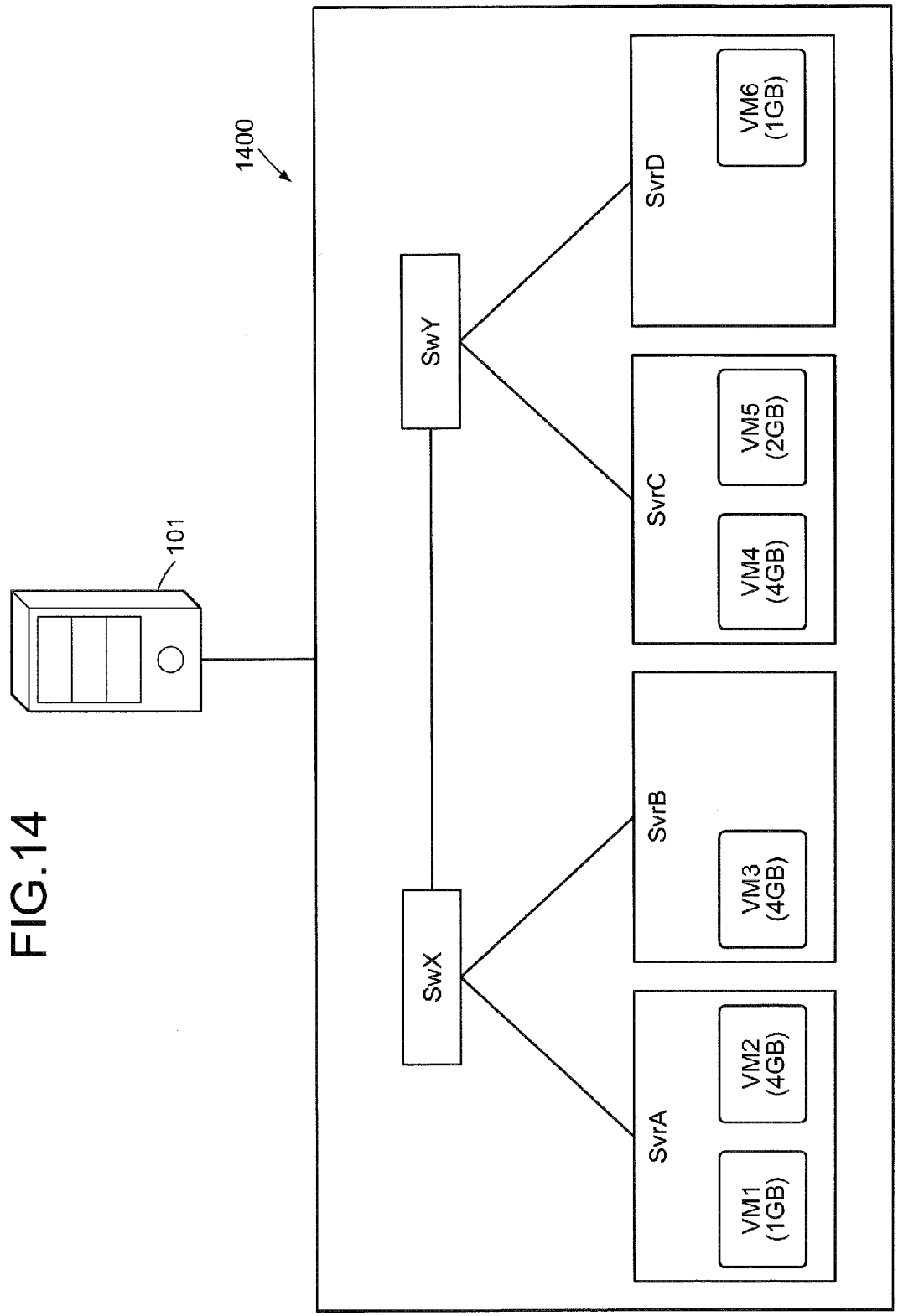
FIG. 14 is an explanatory view (2) of one example of a network system according to the embodiment.

FIG. 14 is an explanatory view (2) of one example of a network system according to the embodiment. In FIG. 14, the network system 1400 includes the execution control device 101, SvrA, SvrB, SvrC, SvrD, SwX, and SwY.

In the SvrA, VM1 (VM size:1 [GB]) and VM2 (VM size:4 [GB]) are running. In the SvrB, VM3 (VM size:4 [GB]) is running. In the SvrC, VM4 (VM size:4 [GB]) and VM5 (VM size:2 [GB]) are running. In the SvrD, VM6 (VM size:1 [GB]) is running.

A case is assumed where execution requests for operations OP1 to OP6 are received at the following times (time t). The policy applied to the operations OP1 to OP6 is the "policy P1" depicted in FIG. 3.

Time t=0
<Operation OP1>
Type "LM"
Process Content "Migrate VM1 from SvrA to SvrB"
Involved Resources "VM1, SvrA, SvrB, and SwX"

Time t=10
<Operation OP2>
Type "LM"
Process Content "Migrate VM2 from SvrA to SvrB"
Involved Resources "VM2, SvrA, SvrD, SwX, and SwY"
  Time t=20
<Operation OP3>
Type "LM"
Process Content "Migrate VM3 from SvrB to SvrA"
Involved Resources "VM3, SvrA, SvrB, and SwX"
  Time t=50
<Operation OP4>
Type "LM"
Process Content "Migrate VM4 from SvrC to SvrB"
Involved Resources "VM4, SvrB, SvrC, SwX, and SwY"
  Time t=70
<Operation OP5>
Type "LM"
Process Content "Migrate VM5 from SvrC to SvrD"
Involved Resources "VM5, SvrC, SvrD, and SwY"
  Time t=100
<Operation OP6>
Type "LM"
Process Content "Migrate VM6 from SvrD to SvrA"
Involved Resources "VM6, SvrA, SvrD, SwX, and SwY"

Figure 15:
FIG. 15 is an explanatory view (2) of an example of the contents of a recommended multiplexing degree table.

Reference of the description returns to FIG. 15. Description will be given of the recommended multiplexing degree satisfying the policy P1, of operations of the type "LM".

FIG. 15 is an explanatory view (2) of an example of the contents of a recommended multiplexing degree table. In FIG. 15, the recommended multiplexing degree table 1500 stores recommended multiplexing degree information records 1500-1 to 1500-3.

The recommended multiplexing degree information record 1500-1 indicates a condition "size2 GB" for the operations of the type "LM" simultaneously executed at the recommended multiplexing degree "3". The conditions relating to the usage rates of the CPU and the I/O in each resource Rk are omitted here.

The recommended multiplexing degree information record 1500-2 indicates a condition "size≤4 GB" for the operations of the type "LM" simultaneously executed at the recommended multiplexing degree "2". The recommended multiplexing degree information record 1500-3 indicates a condition "other" for the operations of the type "LM" simultaneously executed at the recommended multiplexing degree "1".

With reference to FIGS. 16 to 22, an example of the execution control process effected by the execution control device 101 will be described. FIGS. 16, 17, 18, 19, 20, 21, and 22 are explanatory views of the transition of the resource use status.

Figure 16:
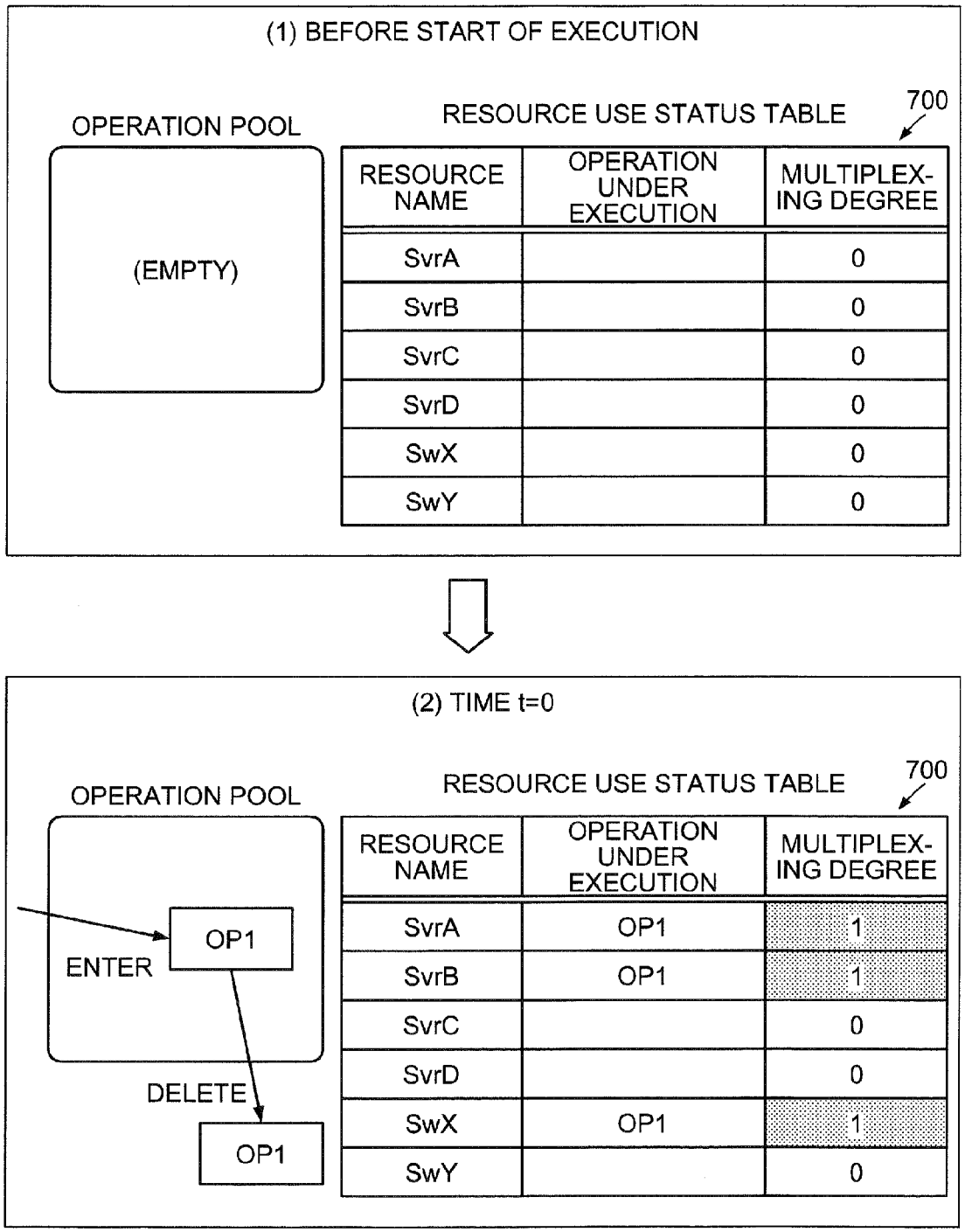

In FIG. 16, (1) Before Start of Execution is the state prior to the start of execution of the operations OP1 to OP6. Therefore, the operation pool is in the empty state. Due to the absence of operations under execution by the resources, the multiplexing degrees of the SvrA to SvrD and SwX and SwY in the resource use status table 700 are "0".

When an execution request for the operation OP1 is received at (2) Time t=0, the operation OP1 is entered into the operation pool. Since the VM size of the VM1 is 1 [GB], the recommended multiplexing degree F1 of the operation OP1 is "3" (see FIG. 15).

Since the multiplexing degrees of SvrA to SvrD and SwX and SwY are "0", the execution of the operation OP1 is started. Consequently, the operation OP1 is deleted from the operation pool and the multiplexing degrees of SvrA, SvrB, and SwX involved in the execution of the operation OP1 in the resource use status table 700 are incremented.

In FIG. 17, when an execution request for the operation OP2 is received at (3) Time t=10, the operation OP2 is entered into the operation pool. Since the VM size of the VM2 is 4 [GB], the recommended multiplexing degree F2 of the operation OP2 is "2" (see FIG. 15).

Since the multiplexing degrees of SvrA to SvrD, SwX, and SwY are "2", the execution of the operation OP2 is started. Consequently, the operation OP2 is deleted from the operation pool and the multiplexing degrees of SvrA, SvrD, SwX, and SwY involved in the execution of the operation OP2 are incremented in the resource use status table 700.

In FIG. 17, when an execution request for the operation OP3 is received at (4) Time t=20, the operation OP3 is entered into the operation pool. Since the VM size of the VM3 is 4 [GB], the recommended multiplexing degree F3 of the operation OP3 is "2" (see FIG. 15).

Among SvrA, SvrB, and SwX involved in the execution of the operation OP3, the multiplexing degrees of SvrA and SwX are "2" and thus, the execution of the operation OP3 is suspended. Consequently, the operation OP3 remains entered in the operation pool.

Figure 18:
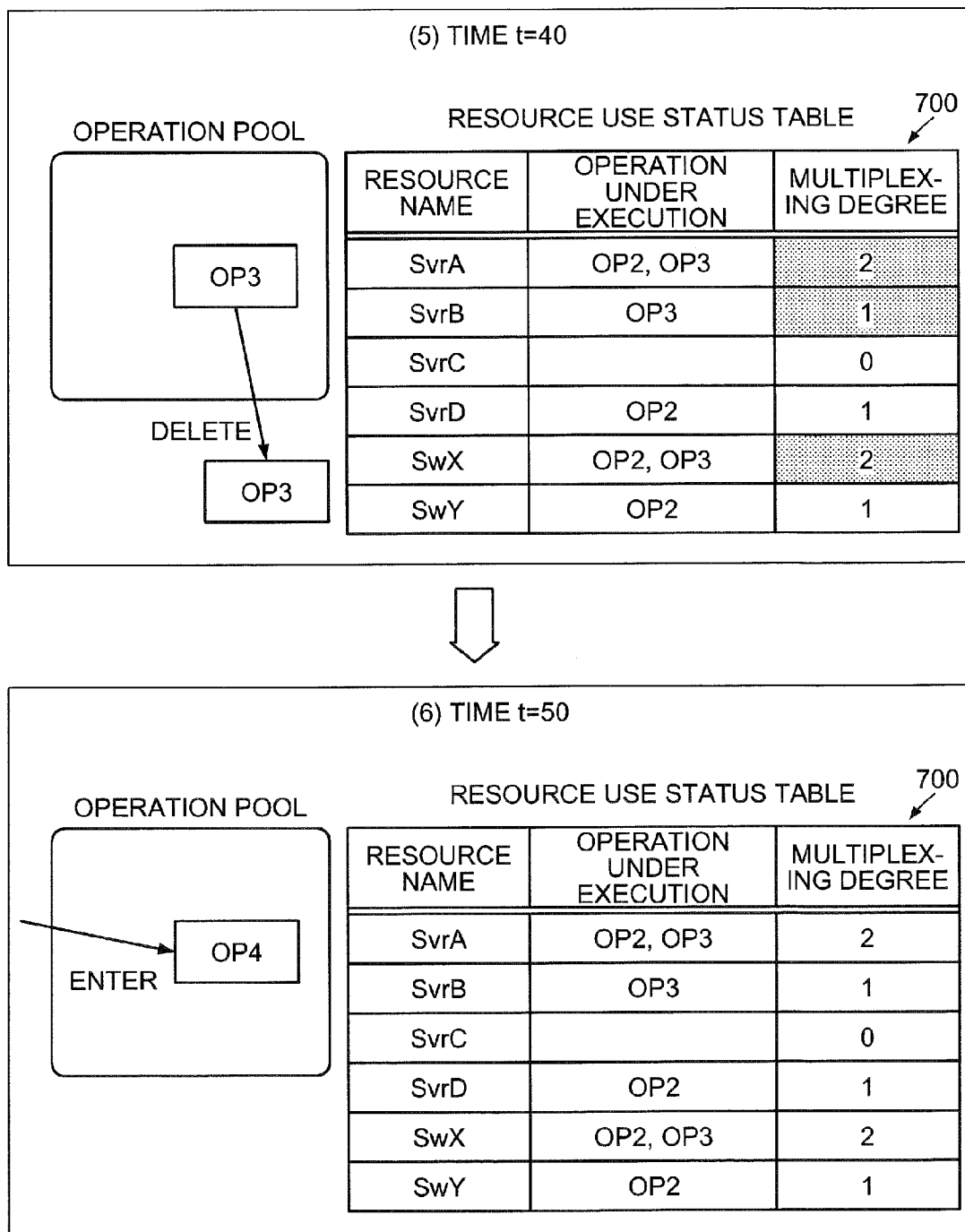

In FIG. 18, at (5) time t=40, the execution of the operation OP1 is assumed to be completed and the multiplexing degrees of SvrA, SvrB, and SwX involved in the execution of the operation OP1 have been incremented. In this case, the multiplexing degrees of SvrA, SvrB, and SwX involved in the execution of the operation OP3 awaiting execution are less than "2" and thus, the execution of the operation OP3 is started. Consequently, the operation OP3 is deleted from the operation pool and the multiplexing degrees of SvrA, SvrB, and SwX involved in the execution of the operation OP3 are incremented in the resource use status table 700.

In FIG. 18, when an execution request for the operation OP4 is received at (6) Time t=50, the operation OP4 is entered into the operation pool. Since the VM size of the VM4 is 4 [GB], the recommended multiplexing degree F4 of the operation OP4 is "2" (see FIG. 15).

Among SvrB, SvrC, SwX, and SwY involved in the execution of the operation OP4, the multiplexing degree of SwX are "2" and thus, the execution of the operation OP4 is suspended. Consequently, the operation OP4 remains entered in the operation pool.

Figure 19:
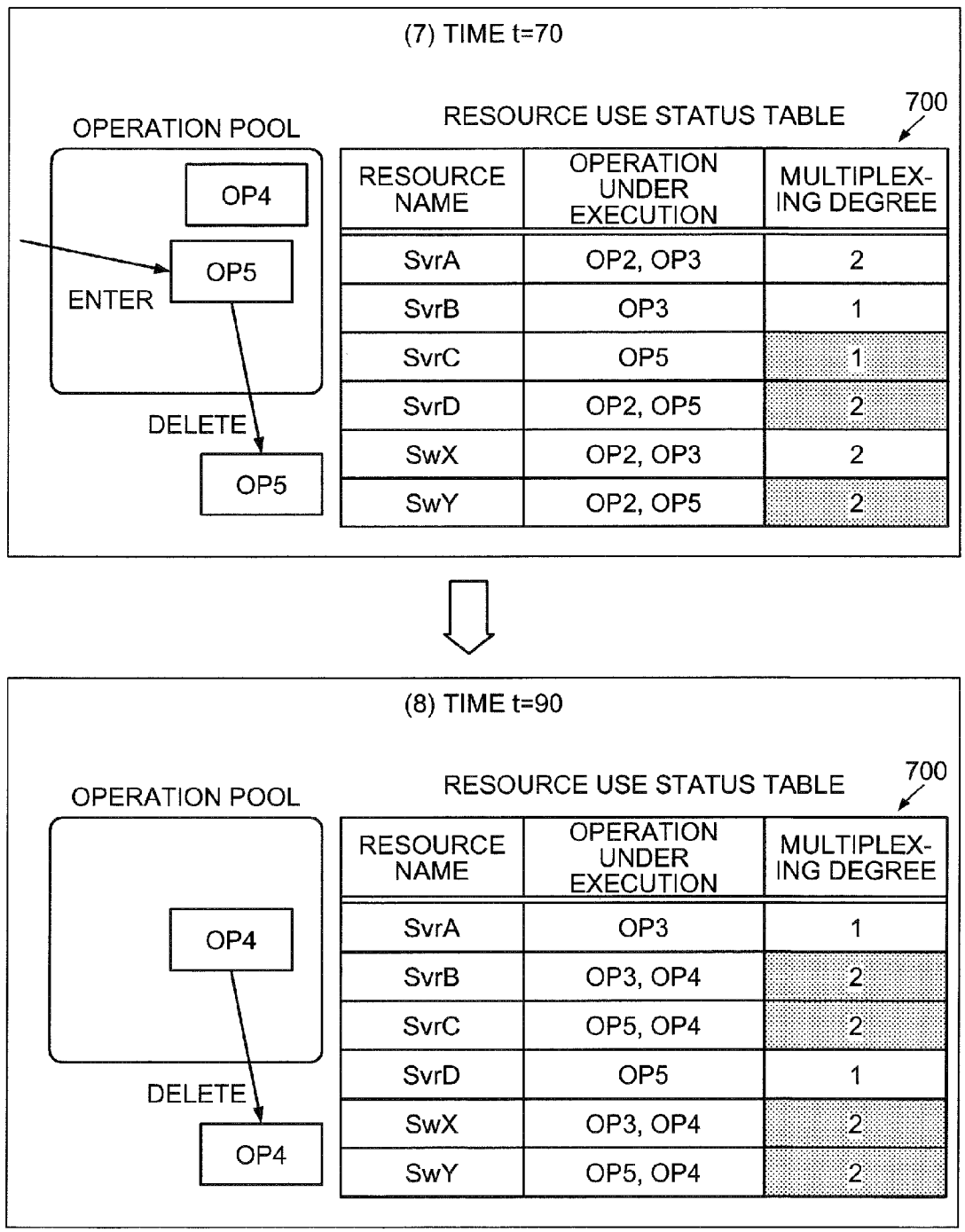

In FIG. 19, when an execution request for the operation OP5 is received at (7) Time t=70, the operation OP5 is entered into the operation pool. Since the VM size of the VM5 is 2 [GB], the recommended multiplexing degree F5 of the operation OP5 is "3" (see FIG. 15).

The multiplexing degrees of SvrC, SvrD, and SwY involved in the execution of the operation OP5 are all less than "3" and thus, the execution of the operation OP5 is started. In consequence, the operation OP5 is deleted from the operation pool and the multiplexing degrees of SvrC, SvrD, and SwY involved in the execution of the operation OP5 are incremented in the resource use status table 700.

In FIG. 19, at (8) Time t=90, the execution of the operation OP2 is assumed to be completed and the multiplexing degrees of SvrA, SvrD, SwX, and SwY involved in the execution of the operation OP2 have been incremented. In this case, the multiplexing degrees of SvrB, SvrC, SwX, and SwY involved in the execution of the operation OP4 awaiting execution are less than "2" and thus, the execution of the operation OP4 is started. Consequently, the operation OP4 is deleted from the operation pool and the multiplexing degrees of SvrB, SvrC, SwX, and SwY involved in the execution of the operation OP4 are incremented in the resource use status table 700.

In FIG. 20, when an execution request for the operation OP6 is received at (9) Time t=100, the operation OP6 is entered into the operation pool. Since the VM size of the VM6 is 1 [GB], the recommended multiplexing degree F6 of the operation OP6 is "3" (see FIG. 15).

Here, although the multiplexing degrees of SvrA, SvrD, SwX, and SwY involved in the execution of the operation OP6 are each less than "3", the recommended multiplexing degrees F3 and F4 of the operations OP3 and OP4 under execution by the SwX and SwY are "2" and thus, the execution of the operation OP6 is suspended. Consequently, the operation OP6 remains entered in the operation pool.

In FIG. 20, at (10) Time t=120, the execution of the operation OP3 is assumed to be completed and the multiplexing degrees of SvrA, SvrB, and SwX involved in the execution of the operation OP3 have been incremented. However, since the recommended multiplexing degree F4 of the operation OP4 under operation by SwY is "2", the execution of operation OP6 continues to be suspended.

In FIG. 21, at (11) Time t=140, the execution of the operation OP5 is assumed to be completed and the multiplexing degrees of SvrC, SvrD, and SwY involved in the execution of the operation OP5 have been incremented. In this case, the multiplexing degrees of SvrA, SvrD, SwX, and SwY involved in the execution of the operation OP6 awaiting execution are less than "3" and thus, the execution of the operation OP6 is started.

The multiplexing degrees of SvrB, SvrC, SwX, and SwY involved in the execution of the operation OP4 in execution are less than "2". Thus, the execution of the operation OP6 is started. Consequently, the operation OP6 is deleted from the operation pool and the multiplexing degrees of SvrA, SvrD, SwX, and SwY involved in the execution of the operation OP6 are incremented in the resource use status table 700.

In FIG. 21, at (12) time t=160, the execution of the operation OP4 is assumed to be completed and the multiplexing degrees of SvrB, SvrC, SwX, and SwY involved in the execution of the operation OP4 have been incremented.

In FIG. 22, at (13) time t=180, the execution of the operation OP6 is assumed to be completed and the multiplexing degrees of SvrA, SvrD, SwX, and SwY involved in the execution of the operation OP6 have been incremented. Thus, executions of the operations OP1 to OP6 for which execution requests have been received are each completed.

Figure 23:
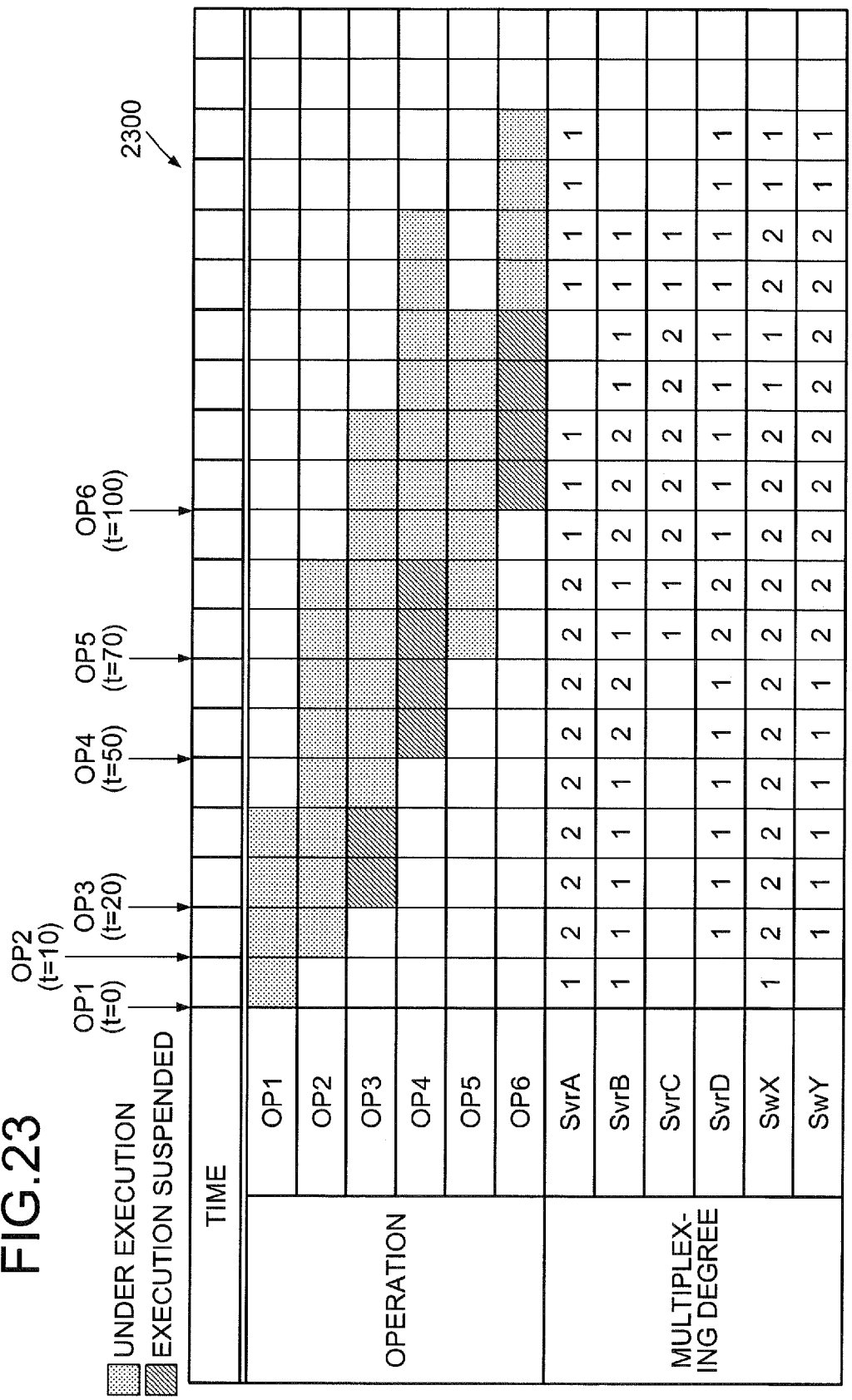
FIG. 23 is an explanatory view of a time line of operations OP1 to OP6.

FIG. 23 is an explanatory view of a time line of the operations OP1 to OP6. In FIG. 23, the time line 2300 shows in time series, the execution statuses (under execution, execution suspended) of the operations OP1 to OP6 and the multiplexing degrees of SvrA, SvrB, SvrC, SvrD, SwX, and SwY.

During time t=20 to 40, the recommended multiplexing degree F3 of the operation OP3 is "2" and thus, the execution of the operation OP3 is suspended. During time t=50 to 90, the recommended multiplexing degree F4 of the operation OP4 is "2" and thus, the execution of the operation OP4 is suspended.

At time t=70, the operation OP4 continues to be suspended whereas the operation OP5 for which an execution request has been received after the receipt of that for the operation OP4 is executed before the operation OP4. During time t=100 to 140, the recommended multiplexing degree F4 of the operation OP4 under execution is "2" and therefore, the operation OP6 continues to be suspended.

By scheduling the execution times of the operations OP1 to OP6 according to the recommended multiplexing degrees F1 to F6 in this manner, it is possible to restrain the overload of the resources and the lengthening of the processing time over the entire processes of the operations OP1 to OP6. That is, plural operations can be efficiently executed in a proper sequence and at a proper multiplexing degree without inducing overload of the resource Rk as a result of simultaneous execution of plural operations and without inducing increases in the overall processing time as a result of individual execution of the operations.

As set forth hereinabove, according to the execution control device 101 of the embodiment, the execution of the operation OPi can be controlled based on the result of comparison between the recommended multiplexing degree Fi of the operation OPi for which an execution request is received and the multiplexing degree Nk of the resource Rk. Accordingly, the operation OPi can be assigned to the resource Rk so that the execution of the operation OPi is completed within a time specified by the policy, to thereby make it possible to restrain increases in the processing time of the operation OPi and overload of the resource Rk.

According to the execution control device 101, the recommended multiplexing degree Fi of the operation OPi can be calculated based on the load information of the resource Rk and on the log information of operations that are of the same type as the operation OPi and executed by the resource Rk. Accordingly, the multiplexing degree for completing the execution of operations of the same type as the operation OPi within the given period by the resource Rk can be calculated as the recommended multiplexing degree Fi of the operation OPi.

According to the execution control device 101, the execution of the operation OPi for which an execution request is received can be controlled based on the result of comparison between the recommended multiplexing degree Fj of the operation OPj under execution by the resource Rk and the multiplexing degree Nk of the resource Rk. This can prevent the execution of the operation OPj from not being completed within the time specified by the policy as a result of assignment of the operation OPi to the resource Rk.

According to the execution control device 101, the recommended multiplexing degree Fi-m of the operation OPi can be calculated for each of the resources R(m) involved in the execution of the operation OPi. A minimum recommended multiplexing degree $Fi_{Min}$ among the calculated recommended multiplexing degrees Fi-1 to Fi-M can be used as the recommended multiplexing degree Fi of the operation OPi. As a result, it is possible to assign the operation OPi in conformity with a bottleneck resource among the resources R(1) to R(M) and to prevent the execution of the operation OPi from not being completed in a time specified by the policy.

According to the execution control device 101, the log information of operations that are of the same type as the operation OPi and executed by the resource Rk can be received from the resource Rk. Thus, the results of execution of the operations that are of the same type as the operation OPi and executed by the resource Rk are fed back so that the recommended multiplexing degree Fi of the operation OPi can be calculated.

As described, according to the execution control device 101, it is possible in the network system 100 to restrain increases in the processing time of the operation management operations that can be executed simultaneously and in plural, and the overload of the resource Rk. The restraint of increases in the operation management operations leads to the prevention of further resource oppression or further service performance degradation. For example, by restraining increases in the processing time of the live migration, it is possible to prevent the resend data amount from increasing and to prevent the operation management network resources from being oppressed. For example, by preventing the VM start processing time from increasing, it is possible to prevent the VM start processes, which are executed simultaneously and in plural, from oppressing the physical server resources and to prevent the VMs under execution on the same physical server from degrading service performance.

The execution control method described in the present embodiment may be implemented by executing a prepared program on a computer such as a personal computer and a workstation. The program is stored on a, computer-readable recording medium such as a hard disk, a flexible disk, a CD-ROM, an MO, and a DVD, read out from the computer-readable medium, and executed by the computer. The program may be distributed through a network such as the Internet.

According to one aspect, resource overload can be prevented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an execution control program causing a computer to execute a process comprising:
    receiving an execution request for a given operation for a system, which specifies at least a type of a given operation, a computing device involved in executing the request, and a policy;
    determining a given period from a policy information table based on the policy, wherein the given period is a time required for completion of the given operation;
    detecting a number of operations that are of the type and are under execution by the computing device that is in the system, the computing device being involved in the execution of the given operation for which the execution request is received;
    comparing the number of operations detected at the detecting and a number of operations that are of the type and simultaneously executable by the computing device such that the execution of the given operation is completed within the given period by the computing device; and
    assigning the given operation to the computing device when the given operation can be completed within the given period, based on a result of comparison at the comparing.

2. The computer-readable recording medium according to claim 1, the process further comprising:
    calculating based on load information of the computing device and on log information of the operations that are of the type and executed by the computing device, the number of operations that are of the type and simultaneously executable by the computing device such that the execution of the given operation is completed within a given period specified in the execution request, wherein
    the comparing includes comparing the number of operations detected at the detecting and the number of operations calculated at the calculating.

3. The computer-readable recording medium according to claim 2, wherein
    the comparing includes, when the computing device is executing the operations of the type, comparing the number of operations detected at the detecting and the number of operations that are of the type and simultaneously executable by the computing device such that the execution of the operations that are of the type and under execution by the computing device is completed within a given period.

4. The computer-readable recording medium according to claim 3, the process further comprising
    executing the detecting and the comparing for each of a plurality of computing devices involved in the execution of the given operation, wherein
    the assigning includes assigning the given operation to the computing devices, based on a result of comparison for each of the computing devices.

5. The computer-readable recording medium according to claim 4, wherein
    the calculating includes calculating for each of the computing devices, the number of operations that are of the type and simultaneously executable by the computing devices such that the execution of the given operation is completed within the given period, the calculating being based on load information of each of the computing devices and on log information of the operations that are of the type and executed by the computing devices, and
    the comparing includes comparing for each of the computing devices, the number of operations detected at the detecting and under execution by the computing devices, and a minimum value of the number of operations simultaneously executable by the computing devices and calculated at the calculating.

6. The computer-readable recording medium according to claim 5, the process further comprising
    receiving from the computing device, the log information of the operations that are of the type and executed by the computing device, wherein
    the calculating includes calculating based on the load information of the computing device and the received log information of the operations, the number of operations that are of the type and simultaneously executable by the computing device such that the execution of the given operation is completed within the given period.

7. An execution control device comprising
    a processor configured to:
    receive an execution request for a given operation for a system, which specifies at least a type of a given operation, a computing device involved in executing the request, and a policy;
    determine a given period from a policy information table based on the policy, wherein the given period is a time required for completion of the given operation;
    detect a number of operations that are of the type and are under execution by the computing device that is in the system, the computing device being involved in the execution of the given operation for which the execution request is received;
    compare the number of operations detected and a number of operations that are of the type and simultaneously executable by the computing device such that the execution of the given operation is completed within the given period by the computing device; and assign the given operation to the computing device when the given operation can be completed within the given period, based on a result of comparison obtained by the comparing unit.

8. An execution control method executed by a computer, the execution control method comprising:

receiving an execution request for a given operation for a system, which specifies at least a type of a given operation, a computing device involved in executing the request, and a policy;

determining a given period from a policy information table based on the policy, wherein the given period is a time required for completion of the given operation;

detecting a number of operations that are of the type and are under execution by the computing device that is in the system, the computing device being involved in the execution of the given operation for which the execution request is received;

comparing the number of operations detected at the detecting and a number of operations that are of the type and simultaneously executable by the computing device such that the execution of the given operation is completed within the given period by the computing device; and assigning the given operation to the computing device when the given operation can be completed within the given period, based on a result of comparison at the comparing.

* * * * *